United States Patent [19]
Gennaro et al.

[11] Patent Number: 5,937,066
[45] Date of Patent: Aug. 10, 1999

[54] TWO-PHASE CRYPTOGRAPHIC KEY RECOVERY SYSTEM

[75] Inventors: Rosario Gennaro, New York City, N.Y.; Donald Byron Johnson, Manassas, Va.; Paul Ashley Karger, Acton, Mass.; Stephen Michael Matyas, Jr., Poughkeepsie, N.Y.; Mohammad Peyravian, Cary, N.C.; David Robert Safford, Brewster, N.Y.; Marcel Mordechay Yung, New York City, N.Y.; Nevenko Zunic, Wappingers Fall, N.Y.

[73] Assignee: International Business Machines Corporation, Armonk, N.Y.

[21] Appl. No.: 08/725,102

[22] Filed: Oct. 2, 1996

[51] Int. Cl.$^6$ .................................................. H04L 9/00
[52] U.S. Cl. .............................................. 380/21; 380/30
[58] Field of Search ......................................... 380/21, 30

[56] References Cited

U.S. PATENT DOCUMENTS

| | | | |
|---|---|---|---|
| 5,276,737 | 1/1994 | Micali | 380/30 |
| 5,315,658 | 5/1994 | Micali | 380/30 |
| 5,436,972 | 7/1995 | Fischer | 380/30 |
| 5,557,346 | 9/1996 | Lipner et al. | 380/30 |
| 5,557,765 | 9/1996 | Lipner et al. | 380/30 |
| 5,745,573 | 4/1998 | Lipner et al. | 380/21 |
| 5,796,830 | 8/1998 | Johnson et al. | 380/21 |
| 5,815,573 | 9/1998 | Johnson et al. | 380/30 |

OTHER PUBLICATIONS

"A Taxonomy for Key Escrow Encryption System", D. E. Denning et al., Communications of the ACM, vol. 39, No. 3, Mar. 1996, pp. 34–40.

Applied Cryptography, Second Edition, Bruce Schneier, John Wiley & Sons, Inc., New York, 1996, pp. 70–71.

"Cryptography: A New Dimension In Computer Data Security", Meyer et al., John Wiley & Sons, NY, pp. 294–299, 368–371, 502–507, 558–569.

"Crptography and Data Security" D. Denning, Purdue University, Addison–Wesley Publishing Co., 1982, pp. 179–185, 228–230.

"Cryptography Sealing for Information Secrecy and Authentication", D. Gifford, Comm. of the ACM, vol. 25, No. 4 pp. 274–286.

(List continued on next page.)

*Primary Examiner*—Salvatore Cangialosi
*Attorney, Agent, or Firm*—William A. Kinnaman, Jr.

[57] ABSTRACT

A cryptographic key recovery system that operates in two phases. In the first phase, the sender establishes a secret value with the receiver. For each key recovery agent, the sender generates a key-generating value as a one-way function of the secret value and encrypts the key-generating value with a public key of the key recovery agent. In the second phase, performed for a particular cryptographic session, the sender generates for each key recovery agent a key-encrypting key as a one-way function of the corresponding key-generating value and multiply encrypts the session key with the key-encrypting keys of the key recovery agents. The encrypted key-generating values and the multiply encrypted session key are transmitted together with other recovery information in a manner permitting their interception by a party seeking to recover the secret value. To recover the secret value, the party seeking recovery presents the encrypted key-generating values and public recovery information to the key recovery agents, who decrypt the key-generating values, regenerate the key-encrypting keys from the corresponding key-generating values, and provide the regenerated key-encrypting keys to the recovering party. The recovering party uses the key-encrypting keys to recover the secret value. Since the key-generating values cannot be derived from the key-encrypting keys, they may be used over a period spanning multiple cryptographic sessions without requiring new values or new public key encryptions.

54 Claims, 9 Drawing Sheets

OTHER PUBLICATIONS

"Fair Public–Key Cryptosystems" S. Micali, Laboratory for Computer Science, Massachusets Institute of Technology, Mar. 93, pp. 1–11.

"MIT/1cs/tr–579 Fair Public–Key Cryptosystems" S. Micali, Lab. for Computer Seience, Mass. Institute of Technology, Sep. 93, pp. 1–33.

"On Secret Sharing Systems", E. Krasniansky et al., Proceedings 1981 IEEE International Symposium on Info. Theory, CA, Feb. 81, pp. 47–48.

"Public Key Cryptography . . . Using Diffie–Hellman", Working Draft: X9.42, Oct. 26, 1995, American National Standard.

"Secure Hash Standard", US Dept. of Commerce, R. Brown, Secretary, Federal Information Processing Standards Pub., Dec. 1994, pp. 1–21.

"Untraceable Electronic Mail, Return Addresses, & Digital Pseudonyms" D.L. Chaum, Comm of the ACM, Feb. 81, vol. 24, No. 2, pp. 84–88.

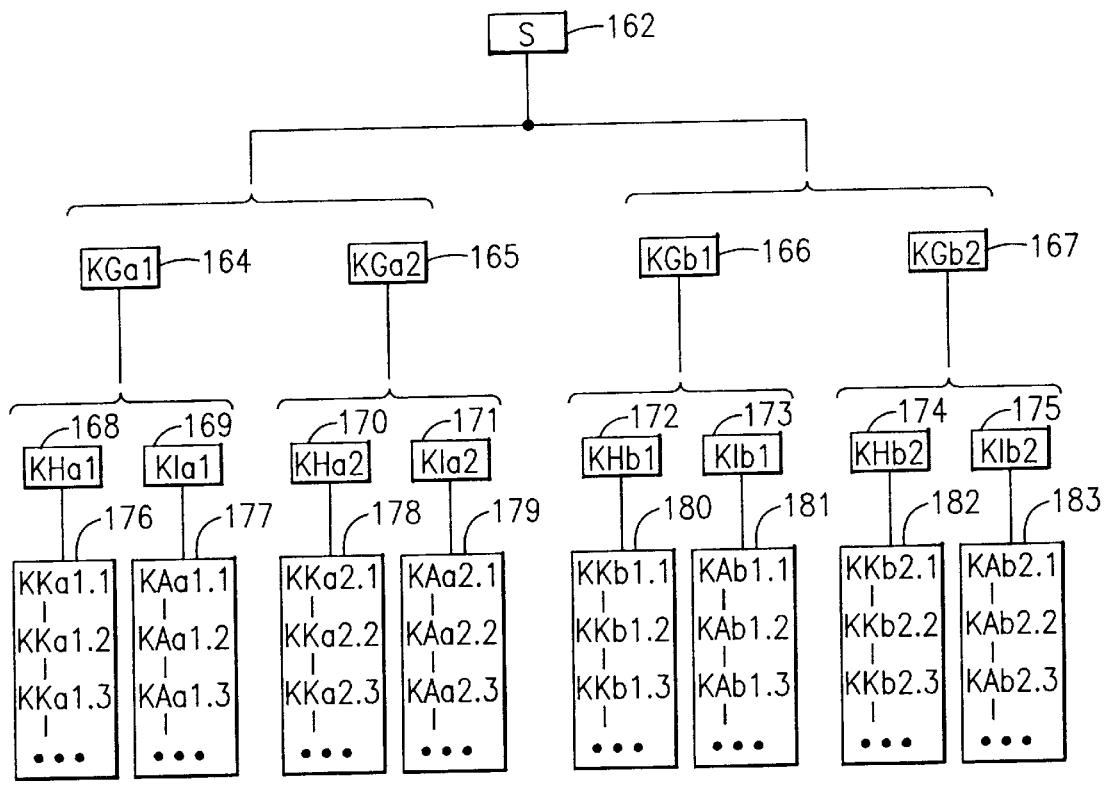

LEGEND:
S : SECRET SEED
KGai : KEY-GENERATING KEY FOR ALICE'S ITH KEY RECOVERY AGENT (i=1,2) USED TO GENERATE KH AND KI KEYS
KGbi : KEY-GENERATING KEY FOR BOB'S ITH KEY RECOVERY AGENT (i=1,2) USED TO GENERATE KH AND KI KEYS
KHai : KEY-GENERATING KEY FOR ALICE'S ITH KEY RECOVERY AGENT (i=1,2) USED TO GENERATE KEY-ENCRYPTING KEYS (KK)
KHbi : KEY-GENERATING KEY FOR BOB'S ITH KEY RECOVERY AGENT (i=1,2) USED TO GENERATE KEY-ENCRYPTING KEYS (KK)
KIai : KEY-GENERATING KEY FOR ALICE'S ITH KEY RECOVERY AGENT (i=1,2) USED TO GENERATE KEY-ENCRYPTING KEYS (KA)
KIbi : KEY-GENERATING KEY FOR BOB'S ITH KEY RECOVERY AGENT (i=1,2) USED TO GENERATE KEY-ENCRYPTING KEYS (KA)

FIG.4

| COUNTRY | ENCRYPT ALGORITHM | MAXIMUM ALLOWED KEY LENGTH (BITS) | | | PUBLIC KEYS | | | |
| --- | --- | --- | --- | --- | --- | --- | --- | --- |
| | | WITHOUT SKR INTRA-COUNTRY | WITH SKR INTER-COUNTRY | | KEY RECOVERY AGENT 1 | KEY RECOVERY AGENT 2 | ... | KEY RECOVERY AGENT N |
| | | | R | ENTIRE KEY | | | | |
| X | DES | INF. | 40 | 64 | 1FCD38... | 74901A | ... | 30FA67 |
| | RC5 | INF. | 40 | 64 | 1FCD38... | 74901A | ... | 30FA67 |
| Y | DES | 128 | 40 | 128 | E52AC3... | F32AB7 | ... | 5EF200 |
| | RC5 | 128 | 40 | 128 | E52AC3... | F32AB7 | ... | 5EF200 |
| Z | DES | 64 | 64 | 128 | 6494FF... | 66673E | ... | 342781 |
| | RC5 | 64 | 64 | 128 | 6494FF... | 66673E | ... | 342781 |
| W | DES | 00 | 00 | 128 | AF88C2... | CBE8F9 | ... | 1BF87C |
| | RC5 | 00 | 00 | 128 | AF88C2... | CBE8F9 | ... | 1BF87C |
| ... | ... | ... | ... | ... | ... | ... | ... | ... |

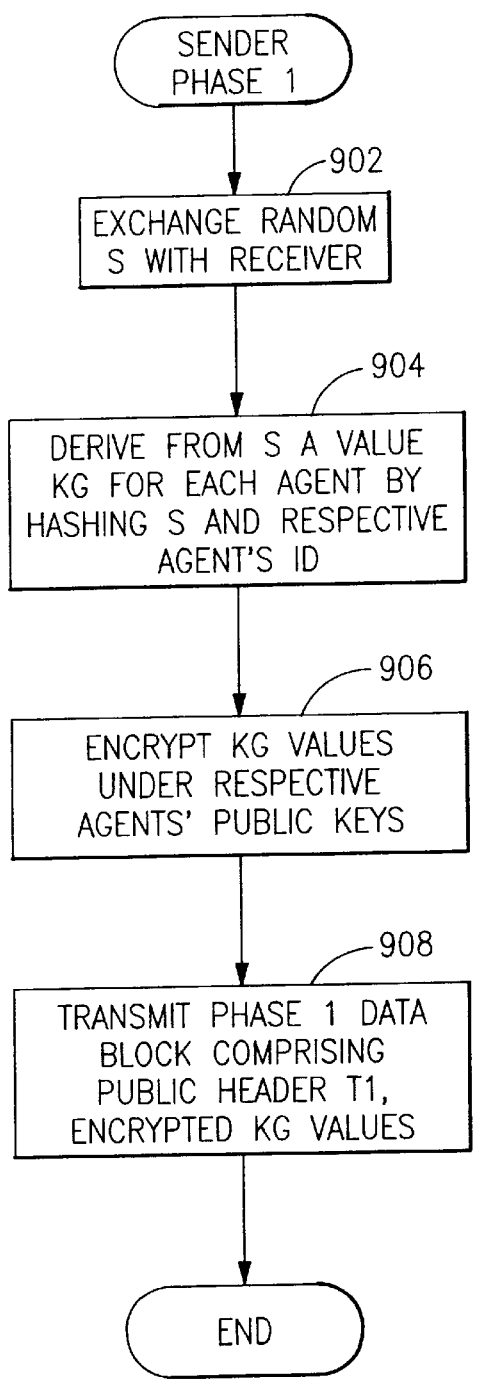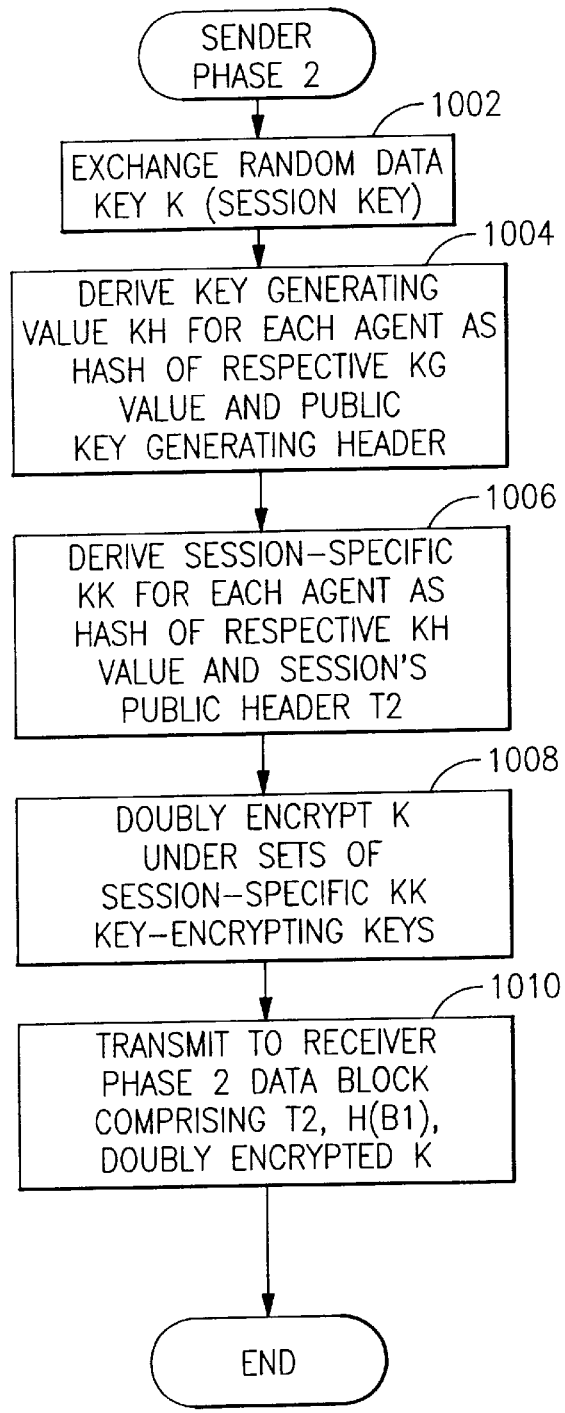
FIG.9                                   FIG.10

PHASE 1 DATA BLOCK B1

| PUBLIC HEADER T1 | ENCRYPTED KGa1 | ENCRYPTED KGa2 | ENCRYPTED KGb1 | ENCRYPTED KGb2 |

FIG.11

PHASE 2 DATA BLOCK

| PUBLIC HEADER T2 | H(B1) | DOUBLY ENCRYPTED K (SENDER'S AGENTS) | DOUBLY ENCRYPTED K (RECEIVER'S AGENTS) |

FIG.12

TWO-PHASE CRYPTOGRAPHIC KEY RECOVERY SYSTEM

BACKGROUND OF THE INVENTION

1. Field of the Invention

This invention relates to a cryptographic key recovery system and, more particularly, to a key recovery system that is interoperable with existing systems for establishing keys between communicating parties.

2. Description of the Related Art

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies, since the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (i.e., systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving the key portions to the key recovery agents (in which case the key portions are said to be "escrowed") or by providing sufficient information in the communication itself (as by encrypting the key portions) to allow the key recovery agents to regenerate the key portions. Key recovery agents would reveal the escrowed or regenerated key portions to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent.

Key recovery systems serve the communicants' interest in privacy, since their encryption system retains its full strength against third parties and does not have to be weakened to comply with domestic restrictions on encryption or to meet export requirements. At the same, key recovery systems serve the legitimate needs of law enforcement by permitting the interception of encrypted communications in circumstances where unencrypted communications have previously been intercepted (as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

A number of desirable features of a key recovery system have been identified. Thus, considering first higher-priority features, a key recovery system should be capable of being implemented in software or hardware. It should not require communication with a third party for installation (i.e., it should work "out of the box"), nor should it require communication with a third party during message creation or connection setup. It should provide interoperability between users in different countries. The algorithms used should be publicly known, and the mechanism should be algorithm independent. The design should be open and should be capable of being implemented by multiple vendors based on published specifications. It should provide a key recovery capability independently for each country. It should provide, in a single system, the flexibility for different levels of security in different environments, and provide the highest level of cryptographic security allowable by law. It should be a modular extension (add-on) to existing cryptographic systems. It should permit any key exchange mechanism to be used, while optionally retaining a control point that enforces compliance with key recovery. The security properties of the exchanged key should be maintained, except for allowing for recovery.

Other features, though of lesser priority, are nevertheless highly desirable. A key recovery system should support both store-and-forward (i.e, non-interactive) and interactive environments. It should support the policy option of requiring the collaboration of multiple key recovery agents to recover the key (to provide protection against a corrupt key recovery agent). It should optionally prevent a patched (rogue) implementation from interoperating with an unpatched (complying) implementation.

Key recovery systems of various types are described in D. E. Denning and D. K. Branstad, "A Taxonomy for Key Escrow Encryption Systems", *Communications of the ACM*, vol. 39, no. 3, Mar. 1996, pp. 34–40, incorporated herein by reference.

Several specific key recovery systems are noted below.

Micali et al. U.S. Pat. No. 5,276,737 ("Micali I") and U.S. Pat. No. 5,315,658 ("Micali II") describe a "fair" public key cryptosystem in which the private key of a public/private key pair is broken into "shares" that are given to "trustees". The "breaking" is done in such a manner that: (1) the shares of all trustees (or a predetermined quorum) are required to reconstruct the key; and (2) each trustee can individually verify the correctness of his share. When all the trustees have certified the correctness of their share, the user's public key (corresponding to the escrowed private key) is certified by a key management center. Upon a predetermined request, the trustees provide their shares to a law enforcement agent or other recovering entity, who then reconstructs the private key from the shares and, with the private key, is able to monitor communications to the user.

While the Micali system advantageously "splits" the key among a plurality of escrow agents, the system has several drawbacks. The Micali system requires the active participation of the trustees before communications can begin between the user and another party. Also, since the trustees must actually hold the shares being escrowed (or store them externally in encrypted form), each trustee may end up holding or storing a large number of shares of keys that are never the subject of a recovery request.

The copending application of D. B. Johnson et al., Ser. No. 08/629,815, filed Apr. 10, 1996, entitled "Cryptographic Key Recovery System" ("Johnson et al. I"), describes a partial key recovery system using multiple key recovery agents. In one version of the system described in that application, the sender generates a set of key recovery values (or key parts) P, Q and (optionally) R. The session key is created by combining the P and Q values by XOR addition, concatenating the result with R, and hashing the concatenation result to generate the key. The P and Q values are then encrypted using the public keys of the respective key recovery agents and the encrypted P and Q values included (along with other recovery information) in a session header accompanying the encrypted message. The R value, if generated, is not made available to any key recovery agent, but is kept secret to provide a nontrivial work factor for law enforcement agents seeking to recover the key.

The receiver verifies the correctness of the recovery information by regenerating the information using its own data and comparing the results. If the regenerated recovery information matches that in the session header, the receiver proceeds to decrypt the encrypted message.

A party (such as law enforcement) intercepting an encrypted message obtains the encrypted P and Q values and other recovery information from the accompanying session header. To recover the session key, the party presents the encrypted P and Q values from the session header to the key recovery agents, who decrypt the P and Q values and return the decrypted values to the party requesting recovery. That party then reconstructs the session key (generating the R value by brute force if necessary) and decrypts the encrypted message.

In another key recovery system, described in U.S. Pat. No. 5,557,346 to Lipner et al., the sender splits a session key into first and second session key portions by setting the first session key portion equal to a random number and setting the second session key portion equal to the XOR product of the random number and the session key. The sender creates a law enforcement access field (LEAF) by encrypting the respective session key portions with the public encryption keys of first and second key recovery agents and concatenating the two encryption products. The sender also creates a LEAF verification string (LVS) by concatenating the original session key portions and encrypts this using the session key to form an encrypted LEAF verification string (ELVS). Finally, the sender transmits an encrypted message, together with the LEAF and ELVS, to the receiver.

Before decrypting the encrypted message, the receiver regenerates the LEAF to verify that the sender has created a proper LEAF that would actually permit recovery of the session key through the key recovery agents. This is done by decrypting the ELVS to obtain the session key portions and then encrypting the respective session key portions with the public encryption keys of first and second key recovery agents. If the receiver succeeds in regenerating the transmitted LEAF in this manner, it concludes that the LEAF is genuine and proceeds to decrypt the message. Otherwise, it concludes that the LEAF is corrupt and does not proceed with the decryption step.

The copending application of D. B. Johnson et al., Ser. No. 08/681,679, filed Jul. 29, 1996, entitled "Interoperable Cryptographic Key Recovery System" ("Johnson et al. II") now U.S. Pat. No. 5,796,830, describes a key recovery system that uses an "entropy-preserving" procedure to generate key recovery values. As disclosed in the Johnson et al. II application, P, Q and R key recovery values (where P and Q are presented in encrypted form to respective key recovery agents and R is kept secret as in Johnson et al. I) are generated using a key inversion function having as inputs only the session key K being recovered and nonsecret information available to the receiver and parties assisting in the recovery process. By using such an entropy-preserving key inversion function, one avoids the necessity of having to convey additional secret information to the receiver merely to enable the receiver to verify the recovery information.

In contrast to the Micali system, the systems of Johnson et al. I and II and Lipner et al. do not require the involvement of the key recovery agents until a key is actually being recovered. However, both of the Johnson et al. systems as well as the Lipner et al. system require the encryption of new key recovery values with the public keys of the key recovery agents for each new session key. Public key encryption is a computationally expensive operation; performing this operation for each new session key greatly increases the computational overhead of the key recovery system.

SUMMARY OF THE INVENTION

The present invention contemplates a system for handling key recovery. It enhances the systems described in the above-identified applications of Johnson et al. by permitting a portion of the key recovery information to be generated once and then used for multiple encrypted data communications sessions and encrypted file applications. In particular, the mentioned portion of the key recovery information that is generated just once is the portion that requires public key encryption operations. Hence, the present invention provides a way of reducing the costly public key encryption operations required in the applications of Johnson et al.

Unlike the prior art, the present invention does not contemplate encrypting the key (i.e., the key to be protected and recovered via the key recovery protocol) under the public key of a key recovery agent, nor does it contemplate splitting the key into parts or pieces or shares and encrypting these parts or pieces or shares of the secret key under the public keys of key recovery agents.

In the present invention, the information encrypted under the public keys of the key recovery agents, and which is the information that a requesting party would eventually provide to a key recovery agent in order to effect the step of key recovery, is comprised of a set of randomly generated keys (called key-generating keys). These keys are independent of and unrelated to the keys intended to be protected and recovered using the key recovery protocol. In fact, the generated key-generating keys can be encrypted with the public keys of the key recover agents prior to knowing the value of the key or keys to be protected under the key recovery protocol. Thus, the present invention permits the costly public key operations to be carried out (potentially) during times when the processing load of the device or system is low, or to spread the required processing over a potentially longer time than otherwise expected, if these operations had to be performed at the time when the key-to-be-protected is processed by the key recovery system. And, the present invention permits the costly public key operations to be performed one time and then used in the key recovery process for enabling the recovery of multiple keys, over a potentially long period of time.

One difference between the key recovery method of the present invention and prior art methods can be explained.

The key recovery method of the present invention is based on a protection mechanism called cryptographic sealing suggested by Gifford (see D. K. Gifford, "Cryptographic Sealing for Information Secrecy and Authentication," *Communications of the ACM*, vol. 25, no. 4, pp. 274–286, April 1982). According to Gifford, the mechanism "is based on the idea of sealing an object with a key." The protection mechanism provides a secrecy property which states that a sealed object is useless to someone who does not have a set of keys that unseals the key that was used to seal the object. Cryptographic sealing is described further by Denning (see D. E. Denning, *Cryptography and Data Security*, Addison-Wesley Publishing Company, Reading, Mass., 1982, pp. 229–230), who says the cryptographic sealing is an example of a "lock and key mechanism." According to Denning, encrypting data "places a lock on it, which can be unlocked only with the decryption key." If X is an object encrypted with a key K; then access to X requires K. Access to K can be controlled by associating an "opener" with X. Openers can provide different kinds of sharing: OR-Access, AND-Access, and Quorum-Access. Each of the different openers can be explained.

With OR-Access, K can be recovered with any Di in a list of n deciphering transformations D1, D2, . . . , Dn. The opener R is defined by the list R=(E1(K), E2(K), . . . , En(K)), where Ei is the enciphering transformation corresponding to Di. For example, (Ei, Di) could be a public and private pair of RSA keys. Because K is separately enciphered under each of the Ei, any person or process with a Di can decrypt and obtain K.

With AND-Access, every Di in the list of deciphering transformations D1, D2, . . . , Dn must be present to recover K. Here the opener R is defined by R=En(En−1( . . . E2(E1(K)) . . . )). Every Di must be present to decrypt and recover K.

With quorum-Access, K can be recovered from any subset of t of the Di in the list D1, D2, . . . , Dn. Here R is defined by the list R=(E1(K1), E2(K2), . . . , En(Kn)), where each Ki is a secret share of K in a (t, n) threshold scheme or key sharing scheme. For the case where t=n, all of the Ki must be recovered to reconstruct the key K, and therefore every Di in the list D1, D2, . . . , Dn must be present to recover K.

The key recovery protection mechanism of the present invention is based on the AND-Access cryptographic sealing mechanism of Gifford. If K represents a key to be protected by the key recovery mechanism, then K is encrypted under one or more pseudorandomly generated key-encrypting keys KK1, KK2, etc. The key-encrypting keys (KK1, KK2, etc.) are derived from the aforementioned key-generating keys (KG1, KG2, etc.), via a process that guarantees that a knowledge of any KK key will not allow a KG key to be calculated, which allows a key recovery agent to disclose one or more of the key-encrypting keys while at the same time guarding the secrecy of the remaining undisclosed key-encrypting keys. Therefore, the present invention contemplates a key hierarchy consisting of key-generating keys provided to key-recovery agents and multiple key-encrypting keys derived from a single key-generating key, and other information, using a one-way hash function. Thus, in the present invention, different key-encrypting keys derived from key-generating keys are used to encrypt the keys protected via the key recovery mechanism. This provides the key recovery agents with a means to give granular access to the protected keys—on the basis of authorized requests—by releasing only the appropriate key-encrypting keys needed to decrypt and recover the protected keys.

In the present invention, the encrypted value of K is appended to the transmitted encrypted message or stored encrypted data file, thereby ensuring that it is available (if needed) to facilitate key recovery. For example, if K is cryptographically sealed (encrypted) with KK1 and KK2 and the encrypted value eKK1(eKK2(K)) is attached to the encrypted message or file, then a requesting party desirous of accessing the encrypted data must first recover K (i.e., carry out the steps of key recovery) by obtaining KK1 from Key Recovery Agent 1 and KK2 from Key Recovery Agent 2, then decrypt eKK1(eKK2(K)) using KK1 and KK2, and finally decrypt the encrypted data with the recovered value of K. It is evident that since the key-encrypting keys KK1, KK2, etc. are pseudorandomly generated, that the key management and key infrastructure supporting KK1, KK2, etc. can be made independent of the key K intended to be recovered by the key recovery mechanism.

By contrast, the method of key recovery described by Micali (U.S. Pat. Nos. 5,276,737 and 5,315,658) is based on key sharing. With key sharing, a key K is first divided into a set of secret shares. The secret shares are escrowed or provided to a corresponding set of trustees. An authorized party can recover the original key K by following the steps of (1) first requesting and obtaining the necessary number of secret shares from the trustees and then (2) combining the secret shares to regenerate K.

Likewise, the method of key recovery described by Lipner et al. (U.S. Pat. Nos. 5,557,346 and 5,557,765) is based on key splitting, performed by setting one key "half" equal to a random number and setting the other "half" equal to the XOR product of the random number and the key.

Schneier defines secret splitting as dividing a message up into pieces. (See Bruce Schneier, *Applied Cryptography*, Second Edition, John Wiley & Sons, Inc, New York, 1996, pp. 70–71.) An example provided by Schneier teaches that a message M can be split by generating three random bit-strings, R, S, and T, and then calculating the dependent bit-string U=M xor R xor S xor T, where M can be regenerated by XORing R, S, T, and U. It is also evident from Lipner et al. and the subsequent teaching by Schneier, that the common and preferred method of splitting involves the generation of one or more random numbers of size equal to the quantity to be split and then calculating one dependent value of equal size (e.g., as the Exclusive OR product of the random numbers and the quantity to be split). Thus, Lipner et al. and Schneier teach that splitting a key or message involves the calculation of at least one dependent value, which can only be calculated after the quantity to be split is known. Thus, in the case of key splitting, the splits or parts of a key cannot be encrypted under the public keys of the trustees (or key recovery agents) before K is known.

Likewise, the P and Q values produced by Johnson et al. II (Ser. No. 08/681,679) now U.S. Pat. No. 5,796,830 are dependent values, which can only be generated after the value of the key K is known. Therefore, Johnson et al. II also suffers from the disadvantage that the P and Q values needed to facilitate key recovery cannot be encrypted until after the key K is known.

The P and Q values produced by Johnson et al. I (Ser. No. 08/629,815) now U.S. Pat. No. 5,815,573 are wholly randomly generated values, and therefore could be generated before the value of K is known and could be encrypted under the public keys of the key recovery agents before the value of K is known. But the method of key recovery described by Johnson et al. I suffers from the disadvantage that the key K is not an independent key value. Instead, the key K is calculated from the independently generated P and Q values, which means that the method of key recovery does not support all forms of key distribution. In this case, one can only use the key recovery mechanism if the key is distributed via the key recovery supported key distribution protocol. By contrast, the present invention has the advantage that the key K can be distributed using any key distribution protocol while still avoiding the disadvantage of a key recovery mechanism based on key sharing, described by Micali, or of a key recovery mechanism based on key splitting, described by Lipner et al.

The method of encrypting data (in this case a message instead of a key) under more than one key, for purposes of controlling access to the data, is described by Chaum (see D. L. Chaum, "Untraceable Electronic Mail, Return Address, and Digital Pseudonyms," *Communications of the ACM*, Vol. 24, No. 2, pp. 84–88, Feb. 1981). Chaum describes a mail system in which each user has a public and private key pair, where Ka is the public key is an addressee with address A. The mail system also includes a computer called a "mix" that processes each item of mail before it is delivered. A participant prepares a message M for delivery to a participant at address A by sealing it with the addressee's public key Ka, appending the address A, and then sealing the result with the mix's public key K1. Thus, each M is doubly encrypted, i.e., it is encrypted with Ka of the addressee and K1 of the mix computer. The mix decrypts each input and forwards the message encrypted under Ka of the addressee A to the addressee. The purpose of the mix is to hide the correspondences between messages in the input to the mix and those in the output of the mix.

Meyer and Matyas also provide a further teaching in which a key (KSTR) is encrypted under two keys (KTR1 and Knode) to form the doubly encrypted key value eKnode (eKTR1(KSTR)), see C. H. Meyer and S. M. Matyas, Cryptography, John Wiley and Sons, Inc., New York,1982, p. 558. The method is also described in U.S. Pat. No. 4,755,940 "Transaction Security System" by Brachtl et al. Within an electronic funds network, the time-variant key KSTR is generated randomly and then encrypted first under the key KTR2 and second under the key Knode, where Knode is a time-variant system key and KTR1 is a key derived from a personal key known only to a customer and a secret PIN (Personal Identification Number) known only to a customer. Thus, to recover the secret key KSTR, it is necessary to know a system-held key, Knode, and a user key, KTR1, derived from user-held information.

There are two cases of secret sharing that can be further discussed: (1) K is a dependent key, or (2) K is an independent key. For the case where K is a dependent key, a simple key sharing scheme can be devised in which each of the secret shares is an independently generated random value. For example, we could generate 5 random integers RN1, RN2, . . . , RN5 in the interval [1, p−1] and define K to be their sum mod p (p is a prime number), as described by Micali in U.S. Pat. No. 5,276,737. The values RN1, RN2, . . . , RN5 would be the secret shares. However, the present invention seeks to provide a recovery mechanism where the key K to be SKR-protected can be any key, arrived at using any independent key transport or key agreement protocol. Thus, the present invention cannot permit K to be a dependent key value. And so, if a secret sharing scheme were to be used, it would be necessary to use a sharing scheme in which K is an independent key value. But, in a secret sharing scheme in which K is an independent key, it must be the case that at least one of the secret shares is a dependent value. For example, if there a three secret shares, then at most two of the secret shares can be independent, randomly generated values. One of the values must be calculated from the two independent shares and the key K. For example, we could generate four random integers RN1, RN2, . . . , RN4 in the interval [1, p−1], where we also assume that K is an integer in the interval [1, p−1], and define RN5 to be the sum of RN1, RN2, RN3, RN4 and K mod p. Therefore, the following can be said of secret sharing when K is an independent key value:

1. At least one of the secret shares must be calculated after the value of K is known.
2. All of the secret shares must be protected (i.e., kept secret). If encryption is used, then at least one encryption can only be performed after K is known.

Key splitting is a technique for splitting a key into splits or parts, where the key is specified as an input. That is, K is an independent key value. Therefore, key splitting suffers the same disadvantage as secret sharing or key sharing. That is, at least one secret share or split or part can only be encrypted after K is known. And, if the shares or splits or parts are to be encrypted with a public key, then not all of the costly public key encryptions can be performed prior to knowing K.

Therefore, the present invention seeks to avoid the disadvantage of key sharing or key splitting by using cryptographic sealing, where the dependent value calculated from the independent random secret values or keys is an encrypted K, not a secret share, and where K is encrypted with a symmetric key algorithm, not a public key algorithm. In that case, the encryption operation is much faster than a public key encryption operation and the encrypted K, unlike a secret share, can be treated as a public value and "made available" in the SKR information transmitted or stored with the encrypted data.

The concept of generating multiple keys, such as multiple key-encrypting keys (KK1, KK2, etc.) from a single key-generating key (KG) is well-known in the art. For example, Working Draft American National Standard X9.42-1995 entitled *Public Key Cryptography For The Financial Services Industry: Establishment Of Symmetric Algorithm Keys Using Diffie-Hellman,* Oct. 26, 1995, describes a method for generating multiple keys from a single shared secret number, which is called Cryptographic Key Derivation. This is accomplished by hashing an input with a one way function, where the input is defined as the concatenation of a shared secret number and public information that includes at least PerPartyData. The PerPartyData contents is defined by the key management protocol. For example, the PerPartyData could include public key recovery information, thereby binding the information associated with a particular data key—to be protected by the key recovery mechanism—with a particular generated key-encrypting key.

In the present invention, as already mentioned, multiple key-encrypting keys (KKs) are generated from a single key-generating key (KG). Thus, the key recovery process of the present invention enables multiple keys (K1, K2, etc.), e.g., multiple data keys (session keys or file keys), to be protected via the key recovery mechanism. This is accomplished by encrypting each key (K1, K2, etc.) using different key-encrypting keys. The key-encrypting keys are generated from the relative stable and long-lived key-generating keys. In the present invention, the key-generating keys are encrypted under the public keys of the key recovery agents. Therefore, to perform a key recovery, the so-encrypted key-generating keys are provided to the key recovery agents, the key recovery agents decrypt the key-generating keys, the key recovery agents then use the recovered key-generating keys to generate the appropriate key-encrypting keys, and the key-encrypting keys are returned to the authorized requesting party. The requesting party then decrypts the encrypted key value, which was appended to the encrypted data. The key recovery mechanism of the present invention therefore permits the costly public key encryption operations (i.e., of encrypting the key-generating keys) to be performed one time and then used multiple times to generate the needed key-encrypting keys which will enable the recovery of multiple keys over a potentially long period of time. Thus, in the present invention, the secret values provided to the key recovery agents are potentially long-lived key-generating keys and the secret values used to cryptographically seal the keys to be protected by the key recovery mechanism are key-encrypting keys, which are derived from these key-generating keys using a key derivation procedure that tightly couples the derived key-encrypting keys to the unique public key recovery information associated with the key being protected by the key recovery mechanism.

By contrast, the key recovery mechanism of Micali (U.S. Pat. Nos. 5,276,737 and 5,315,658) teaches that the secret shares of a key, which are provided to a trustee, are just the same secret shares returned by the trustee to an authorized requesting party. Likewise, the key recovery mechanism of Lipner et al. (U.S. Pat. Nos. 5,557,346 and 5,557,765) teaches that the secret parts or splits of a key, which are provided to an escrow agent, are just the same secret parts or splits of the key returned by the escrow agent to an authorized requesting party. Moreover, Micali and Lipner et al. also teach that the secret shares and parts or splits of a secret key can be protected by encrypting them under the public keys of the trustees, or escrow agents, in which case, the methods disclosed by Micali and Lipner et al. would require costly public key encryptions to be performed for each secret key to be protected by the key recovery mechanism.

The present invention also contemplates that each key recovery agent will have at least one pair of public and private keys (using public key cryptography). But the key recovery agents may have more than one such pair of public and private keys, in order to provide some granularity of separation. It is envisioned that these keys may be changed, either because of a compromise of a key, or because of a suspected compromise of a key, or because of an automatic rollover of the keys in order to maintain the freshness of the keys.

The present invention also contemplates that a key recovery agent will have a domain of jurisdiction, which might be the boundaries of a country (e.g., Germany, France, The Netherlands) or a jurisdiction composed of a defined region of a country or possibly several countries which are combined to form a larger group.

The present invention also contemplates that organizations may also act as their own key recovery agents, in which case, the organization may, at its own discretion, limit the authorized users of the key recovery service to the employees of its own organization, or to some other defined set of users.

The present invention also contemplates that a user may also desire to act as its own key recovery agent.

The present invention further contemplates that organizations and users may also desire to generate their own public and private key pairs, but to provide the private portion of the key to some other key recovery agent which can act in their behalf to perform the required steps of key recovery using the private parts of the keys that have been provided to them by an organization or user. In this latter case, it is contemplated that a key recovery agent may hold the private part of the key of an organization or user, and it will have a capability to use that private part of the key in order to facilitate the necessary steps of key recovery, but it may or may not know the value of the private key part itself. The key recovery mechanism described by the present invention is workable in each and all of the described environments above.

In the present invention there is a strong division of knowledge between the collective set of agents and the recovery service (or law enforcement). This division of knowledge is never bridged—the recovery agents never tell the recovery service their full secret, and the recovery service never tells the agents its information related to K. Thus for recovery of any key K, all recovery agents and the recovery service must cooperate. Specifically:

1. Collectively the agents have no knowledge of K, as law enforcement retains the KKx(KKy(K)), where the notation means K is encrypted with KKy and the result is then encrypted with KKx, and does not reveal it to any agent. Thus, even if all agents collaborate, they cannot recover K. By contrast, in the methods of Micali and Lipner et al., the agents collectively have sufficient information to recover the key.

2. Law enforcement never learns S or any derived KG, even after a lawful recovery of a given K. The agents return only a KK specific to one session. As mentioned, this is essential so that the encrypted KG may be reused, but it also more generally ensures that no recovery can be made without cooperation of the agents, as the agents never reveal their KG.

The present invention contemplates a new method for authorizing access to secret information provided to a key recovery agent or secret information derived from secret information provided to a key recovery agent. For example, in the present invention, secret key-generating keys are encrypted under the public keys of the key recovery agents. In turn, the key-generating keys are used to generate key-encrypting keys. In the case of session communications or store-and-forward e-mail applications, it is envisioned that the key-encrypting keys can be used to encrypt individual data keys (session keys or data-encrypting keys). It is further contemplated that Law Enforcement, with a valid court order or warrant, can obtain the necessary key-encrypting keys from the key recovery agents, thereby allowing them to decrypt the encrypted data keys that are appended to the encrypted messages and in turn to decrypt the encrypted communications or mail. Likewise, if encrypted files are being transmitted or stored within a system, it is contemplated that the sender or receiver of such an encrypted file may find that his or her copy of the file key has been damaged or accidentally erased, in which case the sender or receiver may desire to recover the key using the key recovery mechanism of the present invention. In order to allow the sender or receiver of the encrypted file to recover the data, the present invention provides a new mechanism by which a key recovery agent is prevented from revealing secret information (e.g., a key-encrypting key generated from a key-generating key) to someone other than a legitimate party who is entitled to receive the information.

A method for preventing inadvertent betrayal of escrowed digital secrets by a trustee is taught by Fischer (U.S. Pat. No. 5,436,972). In the Fischer scheme, the user has a secret password which is escrowed. The password is used to derive a symmetric DES key, which in turn is used to encrypt the user's secret (i.e., a secret that the user desires to protect). But any secret could be escrowed, and the invention is not limited to the escrowing of passwords only. In the invention, a user defines an escrow record consisting of self-identification data together with the password, and this combination of information is encrypted with the trustee's public key. This encrypted record is stored in the user's computer as an escrow security record. The key derived from the user's password is then used to encrypt all data on the user's disk. If the user forgets his password, then the retrieval phase of the invention is performed. In this case, the user contacts the escrow agent, provides sufficient credentials to definitively establish his or her identification. The encrypted escrowed record containing the self-identification data and password is also provided to the escrow agent. The escrow agent decrypts the escrow record with its private part of the key, validates the credentials against the self-identification data, and provides the password to the user only if the user is properly verified.

However, a disadvantage of the Fischer scheme is the manner in which the binding of the secret password and the self-identification data is done, namely by encrypting these two pieces of information, as a single unit, with the public key of the escrow agent. Performing this same sort of verification sequence in the present invention would be disadvantageous, since in that case, the receiver (Bob) would be unable to validate the information encrypted under the public keys of the key recovery agents, received from the sender (Alice). This is so because Bob does not know Alice's self-identification data, and moreover Alice would not ordinarily want Bob to know that self-identification data. Therefore it would not make sense for Alice to send her self-identification data to Bob in encrypted form, under a key known to Bob, in order that Bob could perform the step of validating the information encrypted under the public keys of the key recovery agents received from Alice.

Therefore, in the present invention an alternative means is used to bind the self-identification data to the secret, e.g., a secret value derived from the key-generating key KG. In the present invention, the key-generating key and possibly other information (secret or public) known or knowable under the key recovery protocol to the receiver (Bob) is encrypted under the public key of a key recovery agent. This enables the receiver (Bob) to validate the received encrypted quantity by recreating the input from data he knows, encrypting the input with the public key of the key recovery agent which Bob knows, and comparing this so-produced encrypted value with the encrypted value received from the sender (Alice). Thus, Bob can validate the value received from the sender (Alice) if the two encrypted values are equal.

In the present invention, a secret (e.g., a value derived from the key-generating key) is combined with the self-identification data (e.g., by concatenating these values) and hashing the resultant data block with a strong one-way hash function (e.g., using the Secure Hash Algorithm SHA-1 described in Federal Information Processing Standard, FIPS PUB 180-1 Secure Hash Standard, April 1995). This resultant hash value is then stored together with the encrypted data, e.g., in the header record of an encrypted file. In the case of an encrypted file sent form Alice to Bob, Bob could also create a similar hash value and store it the file header record, by using his own self-identification data and the secret (a secret derived from KG), which Bob also knows.

If Alice or Bob later desire to recover one of the key derived from KG, they must provide a set of credentials to the key recovery agent together with the appropriate hash value. The key recovery agent will validate the credentials against the self-identification data, also provided by the user. The key recovery agent will then form an input block consisting of the self-identification data and the secret value derived from KG, using the same procedure that was used by the SKR system to generate the hash value. The resultant data block is then hashed with the same hash algorithm that was used by the SKR system, and the resultant hash value is compared for equality with the hash value supplied by the user. If the two values are equal, then the key recovery agent concludes that the user is valid and is therefore entitled to receive the desired secret (e.g., a key-encrypting key derived from the key-generating key).

The present invention also contemplates a new form of encryption using a keyed shuffler function, as described below.

BRIEF DESCRIPTION OF THE DRAWINGS

FIG. 4 shows the key hierarchy of the present invention.

FIG. 8 shows the global communications policy table for storing the information used by the key recovery system of the present invention.

FIG. 9 shows the steps performed by the sender during phase 1 of the recovery procedure.

FIG. 10 shows the steps performed by the sender during phase 2 of the recovery procedure.

FIG. 11 shows the makeup of the phase 1 data block.

FIG. 12 shows the makeup of the phase 2 data block.

DESCRIPTION OF THE PREFERRED EMBODIMENTS

The key recovery system contemplated by the present invention shall be referred to herein as the Simple Key Recovery (SKR) system. A key for which SKR key recovery information has been created shall be called an SKR-protected key. An SKR-protected key can be any type of secret key, although the discussion shall be limited primarily to data keys. Data keys are keys used to encrypt messages transmitted within sessions or within e-mail applications or they are keys used to encrypt data files. A policy option provides that a user may reveal only a part of a given SKR-protected key.

Communications can be among two or more parties, although the discussion shall be limited primarily to two-party communications. Those skilled in the art will recognize that the SKR protocol can be easily extended to three or more parties. The SKR protocol supports session communications, wherein a sender and receiver interact in real time, and store-and-forward communications such as electronic mail and file transfer applications, wherein the sender and receiver do not interact in real time. Also, the SKR protocol supports file applications involving a single user or application. In this latter case, the application or user who creates a data file is the same application or user who retrieves the data file.

General Environment

Figure 1:
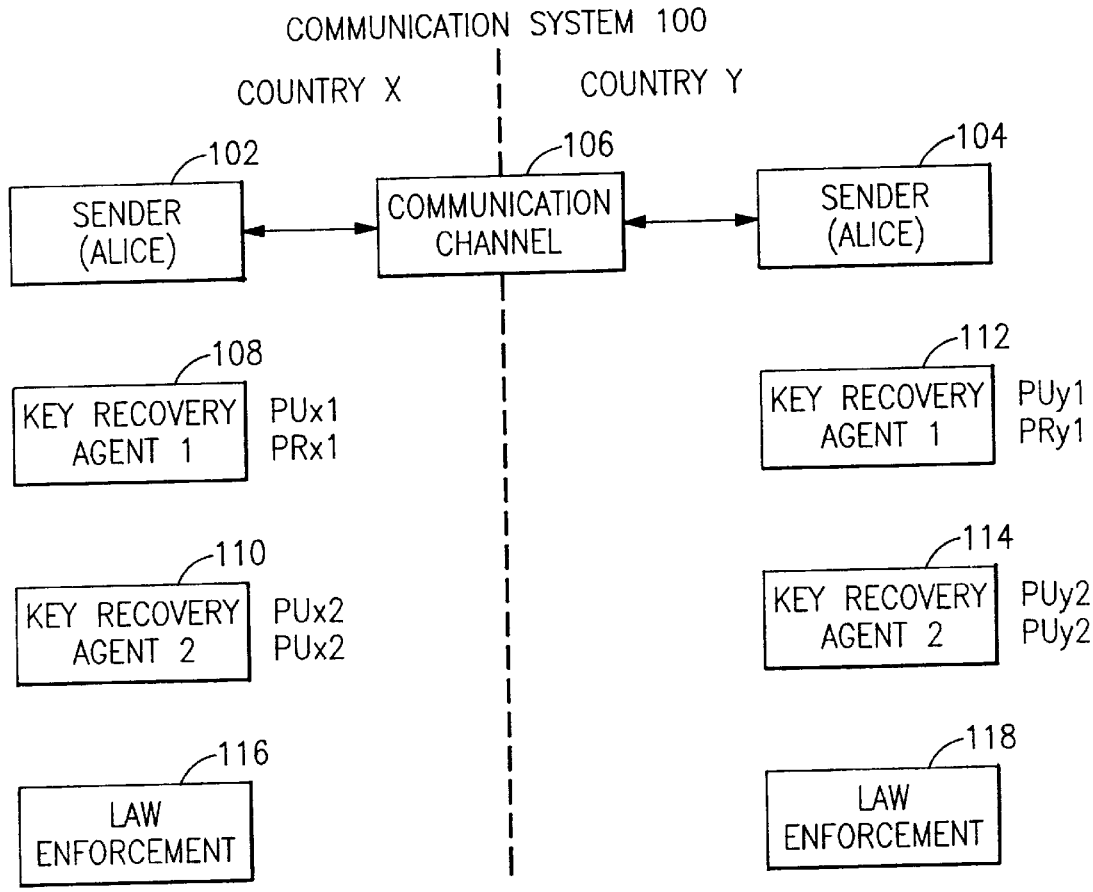
FIG. 1 shows a communication system in which the present key recovery system may be used.

FIG. 1 shows a communication system 100 in which the present key recovery system may be used. In system 100, a sender 102 ("Alice") in country X communicates with a receiver 104 ("Bob") in country Y by transmitting one or more encrypted messages (making up a communications session or electronic mail application) or transmitting one or more encrypted files (making up a file transfer application) over a communication channel 106. Sender 102 and receiver 104 may each comprise computer workstations, suitably programmed to provide the encryption and key recovery functions described below. Although the example of FIG. 1 assumes that the sender 102 and receiver 104 are located in different countries (X and Y), the invention may also be used entirely within a single country.

The example of FIG. 1 specifically addresses the case where there are two different communicating parties (Alice and Bob). However, this two party model also describes (to a degree) the one-party model in which Alice encrypts files.

In that case, the file encryption application may be thought of as a store-and-forward application, where Bob= Alice and a long time exists between the file sending (Alice acting as the sender) and file receiving (Alice acting as the receiver) operations. However, obvious differences affecting the protocols in each of these cases shall be pointed out in the description.

Continuing with the description of FIG. 1, the transmitted messages are encrypted by the sender 102 using a data encryption key and decrypted by the receiver 104 using a corresponding data decryption key. If a symmetric encryption scheme (e.g., DES) is used, then the data encryption key (which is also the data decryption key) is the "secret" data key for the purposes of key recovery (i.e., the SKR-protected data key). However, the present invention is not limited to the protection of data keys. The SKR system can also be used to provide key recovery services for any secret key. For example, if an asymmetric encryption scheme (e.g., RSA) is used, then the private part of the key is the "secret" SKR-protected key for the purposes of key recovery, as described further below.

A pair (in this particular example) of key recovery agents 108 and 110 are selected in country X, while a pair of key recovery agents 112 and 114 are selected in country Y. It is contemplated that the establishment of key recovery agents could take place as part of the establishment of a general public key infrastructure. Each key recovery agent has at least one public and private pair of keys (denoted PU, PR).

The public and private parts of the key for Alice's two key recovery agents in country X are (PUx1, PRx1) and (PUx2, PRx2) and for Bob's two key recovery agents in country Y are (PUy1, PRy1) and (PUy2, PUy2) This enables Alice and Bob to use public key cryptography (e.g., using the RSA, Diffie-Hellman, or Elliptic Curve algorithm) algorithm) to encrypt and protect certain SKR information, until such time as it may be necessary to request the decryption of this information by a key recovery agent.

Communications over communication channel 106 are assumed to be subject to interception by third parties, including respective law enforcement agents 116 and 118 in countries X and Y. Non-governmental third parties intercepting the encrypted communications will be unable to decipher the communications unless they successfully use one or more cryptanalytic techniques. On the other hand, a law enforcement agent 116 or 118 having proper authority will be able to recover an SKR-protected key, using the key recovery agents 108, 110 or 112, 114 for his country as described below, and the sender (Alice) or receiver (Bob) will also be able to recovery an SKR-protected key using a similar procedure.

Two-Phase Protocol

The invention calls for a two-phase system of embedding key recovery information within encrypted communications or encrypted files, consistent with the laws and regulations of the country or countries where the encrypted communications take place or encrypted files are produced.

Figure 2:
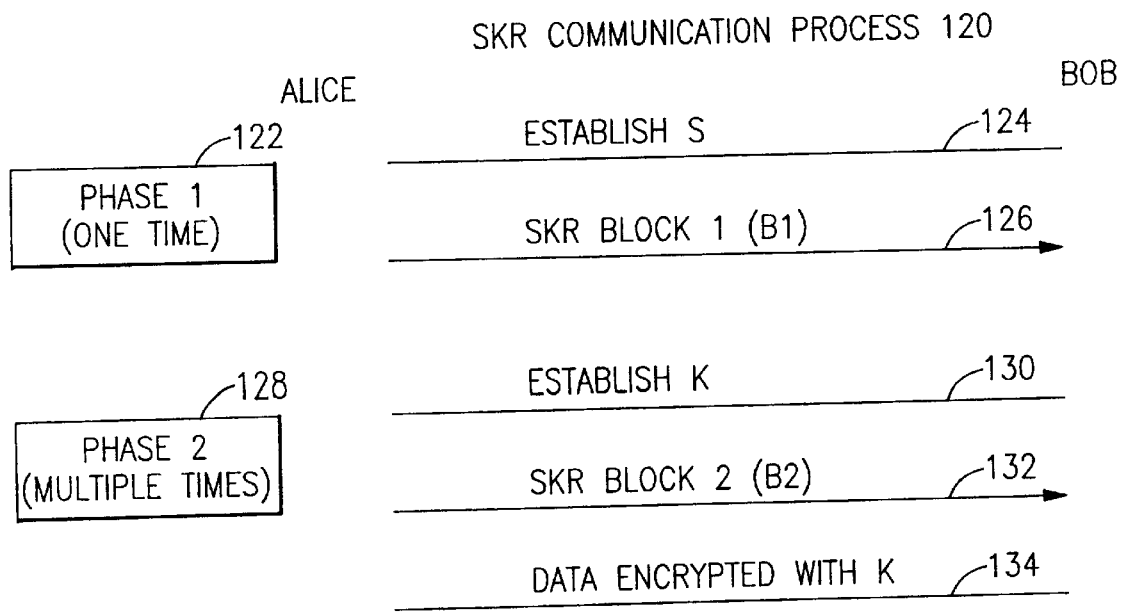
FIG. 2 shows the two phases of the communication process of the present invention.

FIG. 2 shows the two phases of the SKR Communication Process 120, which consists of a Phase 1 122 and a Phase 2 128. In Phase 1 122, the communicating parties (Alice and Bob) establish a common random seed (S) 124, from which random key-generating keys (KG) specific to each recovery agent (not shown in FIG. 2) are derived. The KG are made available to the respective agents (also not shown in FIG. 2) by encrypting them with the public keys of the agents. The encrypted KG are included in an SKR Block 1 (B1) 126 prepared by Alice, which she sends to Bob.

The manner in which random seed (S) 124 is established, depends on the communications environment. In an interactive session, Alice and Bob could establish S interactively (e.g., using a Diffie-Hellman two-pass protocol), or Alice could generate S and send it to Bob (e.g., using an RSA key transport protocol or a Diffie-Hellman one-pass protocol). In store-and-forward application, Alice would send S to Bob (as mentioned above), although it would be possible for Alice and Bob to set up a special session allowing them to establish S interactively. For file encryption applications, where Bob=Alice, Alice would merely generate and store S, and then the encrypted K would be made available by including it in an SKR Block 1 prepared and stored by Alice until a later time when it may be needed by the recovery process (i.e., it is sent from Alice to Alice with a long time delay).

In Phase 2 128, the communicating parties (Alice and Bob) establish a secret data key K 130. Any key transport or key agreement mechanism can be used to establish K, as the means by which K is established is independent of the SKR system. When an encrypted communication session or store-and-forward transmission is desired, the data key (K) is made available for recovery by symmetric encryption under key-encrypting keys (KK) derived from the stored KG (via a hierarchical key derivation procedure). If allowed, only part of the data key K is made available in the recovery information, by holding back a portion, R, of the encrypted K. The encrypted K, or portion thereof (if a portion R is retained), is included in an SKR Block 2 (B2) 132 prepared by Alice, which she sends to Bob. For file encryption applications, where Bob=Alice, Alice would merely generate and store K, and the encrypted K would be made available by including it in an SKR Block 2 prepared and stored by Alice until a later time when it may be needed by the recovery process (i.e., it is sent from Alice to Alice with a long time delay). Finally, the data encrypted with K 134 is communicated or stored in a file.

Referring again to FIG. 2, the division of the key recovery production process into two phases allows the separation of the "Establish S" operation at 124 and the associated public key encryptions required in the preparation of SK Block 1 at 126 (Phase 1) from the per session exchange of K and the associated calculation and verification of the session key recovery information (Phase 2). The information provided in Phase 1: (a) Establish S at 124 and (b) SKR Block 1 at 126, is not in any way based on the per communication or per file information, and can therefore be used across multiple communications or created files. If the information (S and SKR Block 1) is cached, the expensive public key encryptions done in Phase 1 at 122 can be avoided in all but the first communication between parties or first created file, thus greatly reducing the computational effort needed on all sides (two-party encrypted communications and one-party encrypted file applications).

Figure 3:
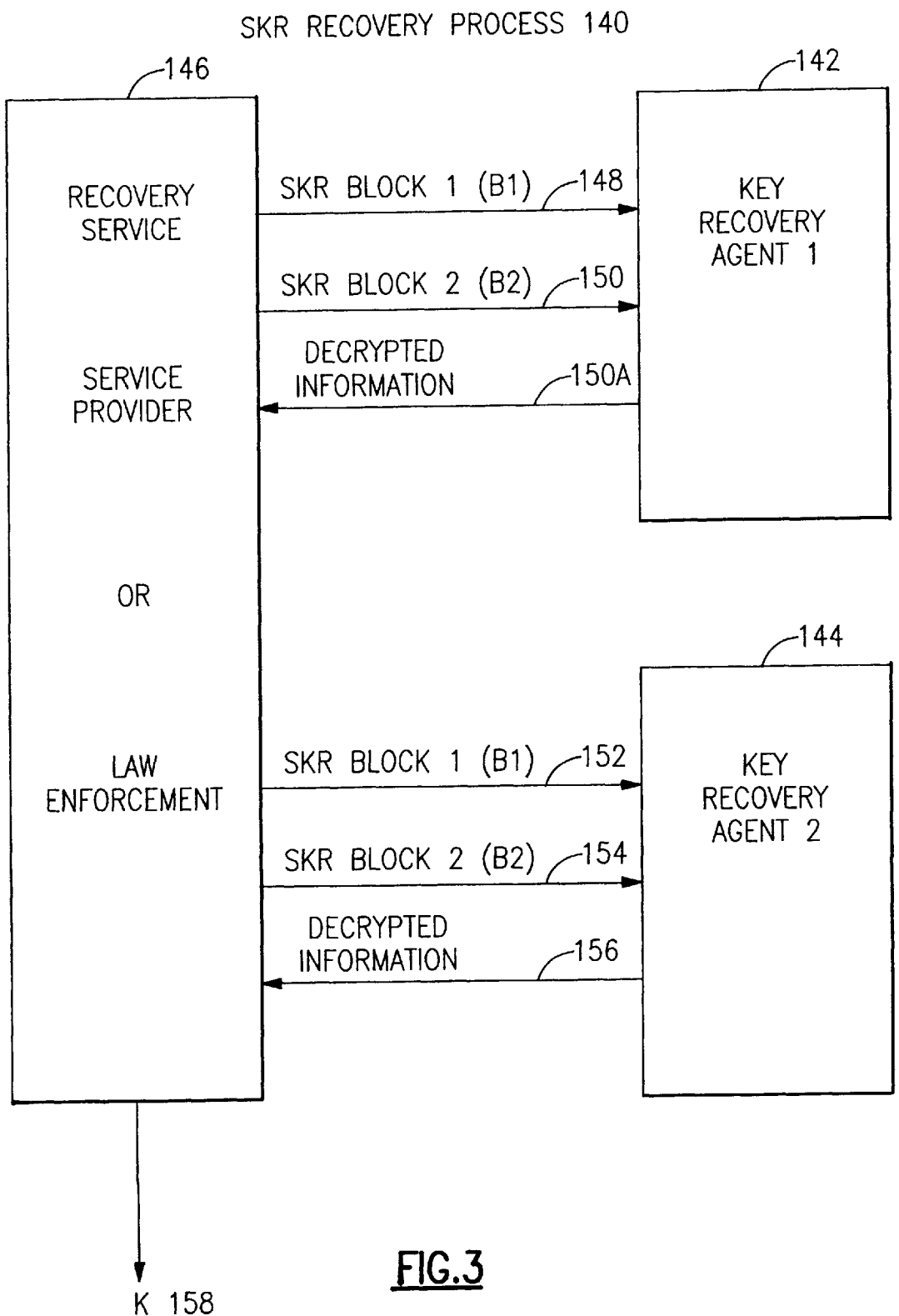
FIG. 3 shows the recovery process of the present invention that allows protected keys to be recovered.

FIG. 3 shows the SKR Recovery Process 140 that allows SKR-protected keys to be recovered. A Recovery Service 146 interacts with a Key Recovery Agent 1 142 and a Key Recovery Agent 2 144 to recover a key K 158. Recovery Service 146 may be operated by a independent Service Provider party on behalf of users or companies, who are desirous to recover damaged or lost keys, or it may be operated by law enforcement on behalf of law enforcement, who is desirous of recovering keys in order to read intercepted communications or files of individuals known or suspected of engaging in criminal activities.

A party who is desirous to recover a key first provides the needed SKR Blocks (1 and 2) to the Recovery Service 146. Recovery Service 146 then provides SKR Block 1 at 148 and SKR Block 2 at 150 to Key Recovery Agent 1 142. In turn, Key Recovery Agent 1 142 uses the provided information together with the private part of his key to decrypt the encrypted KG value, and then to calculate a key-encrypting key (KK) from KG, which is returned to Recovery Service 146 in the Decrypted Information at 150. Likewise, Recovery Service 146 provides SKR Block 1 at 152 and SKR Block 2 at 154 to Key Recovery Agent 2 144. In turn, Key Recovery Agent 2 144 uses the provided information together with the private part of his key to decrypt the encrypted KG value, and then to calculate a key-encrypting key (KK) from KG, which is returned to Recovery Service 146 in the Decrypted Information at 156. The two so-calculated key-encrypting keys, which are different, and are then used by Recovery Service 146 to decrypt the encrypted K in SKR Block 2, and the clear value of K is returned at 158 to the requesting party.

Although not shown in FIG. 3, Law Enforcement can obtain a key K only if it has a valid warrant or court order that can be provided by Recovery Service 146 to Key Recovery Agents 1 and 2. Likewise, a user or company can only recover K if it provides the correct authentication information to the Recovery Service 146, who in turn provides the authentication information to each key recovery agent. Each key recovery agent uses this authentication information to validate the user's or company's right to recover K.

SKR Top-Level Design for Interactive Communication

In the text that follows, nominal data flows are given for a case assuming one sender (Alice), one receiver (Bob), and two recovery agents for each. In addition, the description assumes the case of an interactive session with an existing mechanism for the exchange of S and K in a secure fashion. SKR works as well for cases of any number of communicating parties, any number of agents per party, and non-interactive as well as interactive communication. SKR can also provide a default key exchange mechanism as needed (i.e., where S and K can be established using mechanisms provided by SKR). For simplicity, only the nominal case is described here, and other cases will be covered in the detailed design section.

Key Generation Hierarchy: SKR is largely an exercise in symmetric key management. Symmetric keys are used to protect recovery information for a given SKR-protected data key (session key), and optionally, to protect recovery information used to authenticate recovery requests related to a given SKR-protected data key (session key).

FIG. 4 shows the SKR Key Hierarchy 160. The SKR key hierarchy is an organization of keys into levels according to their uses and derivational relationships. It is the basis on which the functions of the SKR system are organized.

The keys in the SKR Key Hierarchy 160 of FIG. 4 are generated in a hierarchical fashion from an initial random seed, S, 162. From S, pseudorandom key-generating keys, KG 164, 165, 166, and 167 are generated, one per key recovery agent, which are made available only to a given agent, by encryption under the public key of the agent. KGa1 164 and KGa2 165 are the KG associated with Alice's 1st and 2nd key recovery agents, respectively. KGb1 166 and KGb2 167 are the KG associated with Bob's 1st and 2nd key recovery agents, respectively.

The KG key-generating keys are in turn used to derive subordinate pseudorandom key-generating keys, KH and KI (168 through 175) in FIG. 4. For example, KGa1 164 is used to generate KHa1 168 and KIa1 169, KGa2 165 is used to generate KHa2 170 and KIa2 171, and so forth. Finally, the KH key-generating keys (168, 170, 172 and 174) are used to derive subordinate sets of pseudorandom key-encrypting keys KK (176, 178, 180 and 182), respectively. In like manner, the KI key-generating keys (169, 171, 173 and 175) are used to derive subordinate sets of pseudorandom key-encrypting keys KA (177, 179, 181, and 183), respectively. The key-encrypting keys KK are used to encrypt/decrypt the data keys (i.e., the session keys protected by SKR), where a unique KK is used for each session. The key-encrypting keys KA are used for the protection of optional authorization information (AI) fields. However, the present invention does not limit the use of the KA keys to only key-encrypting keys, and other ways of using the KA keys are described below.

One method of deriving the keys in SKR Key Hierarchy 160 of FIG. 4 is to make use of the Cryptographic Key Derivation procedure described in Working Draft American National Standard X9.42.

The example of FIG. 4 illustrates the case of two sets of agents, one set for Alice (a) and one set for Bob (b), where each set contains two agents (1) and (2). In the general case, there may be any number of sets of agents (a, b, c, etc.) and any number of agents in a given set (1, 2, 3, etc.).

Although S is specified here as a random number, those skilled in the art will appreciate that the invention does not limit S to a random number, and that more generally the invention does not limit nor dictate the minimum or maximum number of sessions that may be protected by a single S, nor does it limit, restrict, or prescribe how S can be established or calculated or the particular size of S or the information may or may not be used in determining the value of S.

Phase 1: Phase 1 must occur at least once before the start of one or more encrypted communication sessions. In the typical case, it could be done once before the start of the first session between parties, and the information reused for subsequent sessions between the parties, until some time at which phase 1 is repeated. If desired, phase 1 can be performed for every session, although this eliminates the performance benefit of reusing the public key operations.

In phase 1, Alice and Bob exchange a random value S, using an external key exchange mechanism. If no exchange mechanism is available, Alice can simply pick a random S, and have SKR transport it to Bob as part of the phase 1 SKR data block. Alice uses this S to generate pseudo random KG values, one for each of the recovery agents needed for both Alice and Bob, as depicted in FIG. 2 in the "Key Derivation Hierarchy" section. These KGa1, KGa2, KGB1, and KGb2 values are encrypted under the public keys of the respective recovery agents, and placed in the SKR phase 1 data block (B1) that is sent to Bob.

Both Alice and Bob may cache at least S along with a hash of B1 for future use.

Referring to FIGS. 9 and 11, in a simplified data flow phase 1 consists of:

1. Alice and Bob exchange a random S (step 902).
2. Alice derives from S a value KG for each agent, by hashing S and the respective agent's ID (step 904).
3. Alice encrypts the KG values under the respective agents' public keys (step 906).
4. Alice sends to Bob the SKR phase 1 data block B1 (FIG. 11) composed of: T1, ePUa1(KGa1), ePUa2 (KGa2), ePUb1(KGb1), and ePUb2(KGb2) (step 908).

where the above quantities are defined as follows:

T1: a public header containing IDs of Alice, Bob, and all key recovery agents.
e: public key encryption
PUa1: public key for Alice's first agent
PUa2: public key for Alice's second agent
PUb1: public key for Bob's first agent
PUb2: public key for Bob's second agent
KGa1: key-generating key for Alice's first agent
KGa2: key-generating key for Alice's second agent
KGb1: key-generating key for Bob's first agent
KGb2: key-generating key for Bob's second agent Phase 2: Phase 2 occurs prior to the start of encryption for each encrypted session. In phase 2, Alice and Bob exchange a data key K (session key) with some external key exchange mechanism. If needed, Alice can pick a random K and the SKR phase 2 data block can transport it to Bob. For each set of agents, Alice doubly encrypts K under the respective set of key encrypting keys (KK), and sends these values to Bob in the phase 2 data block, along with a hash of the corresponding phase 1 block (B1).

Referring to FIGS. 10 and 12, in a simplified data flow phase 2 consists of:

1. Alice and Bob exchange a random data key K (session key) (step 1002).
2. Alice derives a key generating KH value for each agent as the hash of the respective KG value, and a public key-generating header (step 1004).
3. Alice derives a session-specific KK for each agent as the hash of the respective KH value and the session's public header T2 (step 1006).
4. Alice doubly encrypts K under the sets of session-specific KK key-encrypting keys (step 1008).
5. Alice sends to Bob the SKR phase 2 data block (B2) (FIG. 12) composed of: T2, Hash(B1), fKKa1.1 (fKKa2.1(K)), and fKKb1.1(fKKb2.1(K)) (step 1010).

where the above quantities are defined as follows:

T2: a public header containing T1, session ID, timestamp, etc.)
f: symmetric key encryption
Hash(B1): hash of block B1
KKa1.1: first key-encrypting key for Alice's first agent
KKa2.1: first key-encrypting key for Alice's second agent
KKb1.1: first key-encrypting key for Bob's first agent
KKb2.1: first key-encrypting key for Bob's second agent Recovery Phase: In a recovery phase, a set of agents are given all of block 1, and T2 from block 2. They are not given the doubly encrypted fKK1(fKK2(K)), so they are not able to recover a key, even if they pooled their respective KG information. Given the appropriate SKR information, they decrypt their respective blocks, obtaining their respective KG values. Given their KG values, and T1 and T2 headers, they can generate the KK and KA values for the session covered by the T2 header. If an authorization information field (AI) exists, the secret KA key may be used to validate the recovery request. If a recovery request is valid, each agent returns only the calculated KK value to the recovery service, which is then able to recover the data key K (session key) from the doubly encrypted recovery field fKK1(fKK2 (K)).

Importantly, an agent does not return the generating KG value, but only specific values derived from KG. For example, an agent would only return specific key-encrypting keys (KK) to Law Enforcement. Thus the longer-term secret KG information is not compromised, and can remain in effect, as other data keys (session keys) are not recoverable given one KK value.

A user and agent may decide that the user wants the agent to return a KH if the user provides sufficient AI validation, so that the user may more conveniently recover a set of sessions. This decision is left up to the application, user and agent. However, the present invention does not contemplate a set of circumstances that would demand an agent to divulge KG to anyone, as the separation of knowledge between the recovery service and the agents is a fundamental feature of SKR, and it is important to the secure reuse of the public key encryptions of the KG secrets.

SKR Design Details

Further details are now provided to show how the invention may be practiced.

Selection of Encryption Algorithms Within SKR: SKR is independent of the session-level encryption used between Bob and Alice. SKR itself, however, uses both symmetric and asymmetric encryption to calculate the values within the SKR blocks. The encryption algorithms used within SKR may also be freely chosen, and the choices are indicated as parameters within the T1 and T2 headers. By default, RSA is used for public key encryption, and a keyed shuffler (described below) is used for symmetric encryption. The keyed shuffler is used by default, as it has the useful property of accepting arbitrary size encryption keys, and arbitrary size data blocks. Another possible choice for the symmetric encryption used within SKR would be to use the same encryption algorithm as used by the application for the session level encryption. This would offer the advantage of availability, as the application has already implemented it, and therefore the symmetric key encryption within SKR would have the same strength as the encryption used to protect the session data.

Optional Transmission of S or K: If needed, SKR can transmit either or both S and K. Provided that Bob has a public key pair to perform key distribution, this can be done by encrypting the S or K value under Bob's public key, and adding the encrypted value to the SKR information sent to Bob (e.g., by including it in the phase 1 or phase 2 SKR data block).

Recovery Validation Hash and R: In the top level design, the simplified data flow showed the transmission of the entire value of the double encryption of the data key K (session key). If a part R is to be held back from the recovery field, this is done by removing R from the resultant encrypted K, as in: fKKa1.1(fKKa2.1(K))–R. For example, if the session key K is 168 bits (triple DES), and the part R to be held back is 40 bits, then the least significant 40 bits of the doubly encrypted K are removed, and only the most significant 128 bits are included in the SKR block.

To be able to validate a trial R value during the recovery process, additional recovery validation fields Ha and Hb (one per set of agents) are added to the phase 2 SKR block. Ha and Hb are defined to be:

Ha=Hash(validation header, counter, fKKa1.1(fKKa2.1(K)), T2, KKa1.1, KKa2.1)

Hb=Hash(validation header, counter, fKKb1.1(fKKb2.1(K)), T2, KKb1.1, KKb2.1)

where Hash() is the hash of the concatenation of the listed data items.

The hash is performed as many times as necessary, with an incrementing counter, so the validation hash is long enough to ensure that the probability of collision (i.e., a false validation of R) is sufficiently small. For example, if r represents the number of bits in R and the length of Ha is $2r+t$ (for any value of t), then the probability that two values of R end in the same value of the hash is about $e^{-t}$ (where e is the base of natural logarithms 2.7182818 . . . ). A value of $t \geq 20$ would probably be sufficient.

With these added fields, trial values of R can be used to construct trial values of fKKa1.1(fKKa2.1(K)), then the hash taken, and compared to see if the trial R was correct. Note that this search cannot proceed unless both agents in a set have decrypted their respective encrypted KG fields from the phase 1 SKR block, calculated the respective KK key-encryption keys (e.g., KKa1.1 and KKa2.1), and returned them to the recovery process.

Non-Interactive Communications: The design presented for SKR describes an interactive session between Alice and Bob. Here the term "interactive session" denotes that the process on Alice's and Bob's ends occurs in the same time frame, so that the processes may interact, and exchange information during the execution of the protocol. In the more general situation, a communication may be non-interactive, in which case the processes on both ends may occur at different times, so they cannot exchange information during the execution of the protocol. Examples of non-interactive communications include (1) e-mail, where the composition of the mail by Alice, and the reading of the mail by Bob occur at different times, and (2) data archiving, in which the archiving of data by Alice is done at one time, and the retrieval or the archived data (conceivably also by Alice) is done at a later time. (While data archiving may appear to involve only one user, it really does involve a sending and a receiving user, but these users are often the same person.)

The SKR design handles non-interactive communications without modification. As non-interactive communications cannot exchange information during the execution of the SKR protocol, this may restrict the methods used for the exchange of the S and K keys, but this nominally occurs outside the SKR process. If SKR is used to exchange S and K, it uses a method suitable for either interactive or non-interactive situations (i.e., encryption under the public key of the recipient).

Validation of SKR blocks 1 and 2: The design presented so far does no validation of SKR blocks 1 and 2. While this may be acceptable for some applications, in the general case, some applications may wish to validate the recovery information in some manner, so that both sides of a conversation can ensure that proper recovery information has been provided.

One method of validation is for Alice to generate the SKR blocks as described, and for Bob to validate them. Validation by Bob is straightforward, as Bob knows the secret values S and K, and can therefore duplicate the creation of the blocks, and verify his results against the values sent from Alice. (One complication of this validation is the use of random information in typical public key encryption methods. This aspect of the invention is covered in the next subsection.)

One problem with this method is that Alice must have complete knowledge of Bob's recovery requirements, including any optional recovery fields he may want to include. In addition, Bob would either need to know Alice's information in advance, or wait to see the T1 and T2 header information before he could start validation, thus doubling the SKR startup delay.

A different, and possibly preferred method for ensuring that all recovery information is correctly provided is for Alice and Bob to each produce SKR recovery blocks independently and for Alice and Bob not to check each other's so produced blocks. In this mode, if at least one side is correctly configured, all required recovery information is correctly produced. In addition, both Alice and Bob are free to include any optional recovery fields without causing a false invalidation of what the other sent. One limitation of this method is that it cannot be used in non-interactive communications.

SKR does not dictate which method of generation-validation is used. In all cases Alice creates SKR blocks. A given application may have Bob check Alice's block, produce his own blocks, or do no checking, depending on the application's needs, and possibly local laws or regulations.

In addition to varying the method of validation, the level of checking may also vary. In those cases in which Bob is validating Alice's SKR blocks, he may do complete validation of all entries in the blocks (including validating the parts encrypted for the agents), or he may check only parts of the messages. For example, he may not want to validate the public key-encrypted parts, due to the computational effort involved in public key encryption, but he could still validate all other parts. While this would not guarantee that Alice had performed the encryptions correctly, it would validate that her selection of agents and their respective R values was correct. This type of partial checking could be important for applications sensitive to communication latency—if Alice is able to precompute the SKR block, and Bob does only partial checking, the startup latency would be significantly faster, as no public key operations would be involved, and Bob would still be validating some important parts of Alice's SKR process. This is particularly useful when both Bob and Alice are generating independent SKR information, as partial validation would provide greater probability of proper recovery (e.g., that the other's system is configured properly and operating properly), without the additional time needed for full validation of the included public key encryptions.

Additional Caching: In the design presented so far, Bob and Alice are able to cache the public key encrypted KG values derived from their shared secret seed S. In the general case, these encrypted KG values can only be reused in subsequent conversations between Alice and Bob, but not with other parties, as S is known only to Alice and Bob, and S must be known for another receiver to fully validate the recovery information.

The encrypted KG values may be reused in conversations with other parties under two different conditions. First, they can be reused if the value of S is explicitly transmitted to the new party. Second, they can be reused if either partial validation of B1, or no validation of B1 is to be done by the receiver. For example, if Alice creates a set of encrypted KG for her agents at the start of a session with Bob, she could reuse these encrypted KG for a conversation with Ted, if either she sends the S to Ted, or Ted does not use S to validate the encrypted KG values in the transmitted B1. The only complication of the nominal data flow in phase 1 to support such reuse is to recognize that a given encryption of KG also encrypts the hash of a given T1, so if the encryption is reused in a new phase 1 block, (which has a new T1), the old T1 would also need to be sent with the encrypted KG field, so that the agent could later match the encrypted hash of T1 to the public old T1.

In the preferred case, Alice and Bob have an interactive session, each generate the SKR blocks independently, and do only partial checking of each other's SKR blocks. In this situation, Alice and Bob do not have to exchange S at all, and are free to reuse an S that was previously calculated, possibly even from sessions with other parties. If the agents involved are the same, the reuse of S would avoid additional public key encryptions. As Alice may communicate with many parties with the same set of recovery agents, the ability to reuse encrypted KG for a given set of agents offers a significant further reduction in the computation required for the public key operations used to encrypt each agent's KG value.

Encryption Salts: In the general case, public key encryption can be expressed in the form $$c = K(D, X)$$

where the cipher text c is derived as an encryption under key K of the data D and random value X. Any one of several public key encryption algorithms can be used, including RSA PKCS-1 encryption, RSA encryption with enhanced optimal asymmetric encryption (EOAE), and Diffie-Hellman encryption. The first and last of these algorithms are well known in the art and hence will not be described.

RSA encryption with enhanced optimal asymmetric encryption (EOAE) is an encryption procedure in which a formatted block (comprising data plus appended values) is subjected to a plurality of masking rounds (similar to those of the keyed shuffler described below except that the hashes are not keyed) before encrypting the result of the masking rounds using RSA encryption. The procedure is described in the copending application Ser. No. 08/681,679 of Johnson et al. (Johnson et al. II), as well as in the ANSI X9.44 RSA Key Transport draft standard and in D. B. Johnson and S. M. Matyas, "Enhanced Optimal Asymmetric Encryption: Reverse Signatures and ANSI X9.44", *Proceedings of the 1996 RSA Data Security Conference*, San Francisco, Calif., 1996, incorporated herein by reference.

For RSA PKCS-1 encryption, the X is used to seed a random number generator used for random padding of the data up to the block size. For RSA encryption with enhanced optimal asymmetric encryption (EOAE) (described below), the X corresponds to the salt appended explicitly to the data, as no other random padding is done. In the case of Diffie-Hellman encryption, X can represent the random value used to generate Alice's ephemeral key pair, which along with the agent's public Diffie-Hellman key, is used to generate the common key, which is then typically used as a mask for the data.

For example, if Alice wishes to send KGa to agent "a" using Diffie-Hellman, she would use X to generate an ephemeral diffie-hellman key pair, {KPx, KSx}, where KPx is the public part, and KSx is the secret part. Given the public key part of agent "a" (KPa), Alice would calculate the common key KC=KSx to the power KPa. The cipher text c would now be the compound set {KPx, KC(M)} which is her ephemeral public key, and the original data D encrypted by the common key KC. (This encryption may be simply using KC to derive a mask which is XORed with D, or a more general symmetric encryption method using KC as the key.) Given {KPx, KC(D)}, the agent would calculate KC=KSa to the power KPx, and would use this to decrypt D.

In summary, Diffie-Hellman can easily be used in SKR, so long as the random X is used to create the ephemeral key pair, and the ephemeral public key KPx is included as part of the cipher text.

In all of these cases, Bob may need to know the value X to be able to reproduce, and thus validate, the public key-encrypted fields within the SKR phase 1 block. To enable Bob and Alice to agree on the random salts used, the salts are pseudorandomly derived from the exchanged S, which is also used as the generation source of the KG values. Thus S is the source of all necessary randomness used in the SKR process. Specifically, the KG and salt values are generated as:

$$KGx = Hash(KG \text{ generating header, counter, } T1, \text{ agent x's ID, } S)$$

$$saltx = Hash(salt \text{ generating header, counter, } T1, \text{ agent x's ID, } S)$$

where

Hash(x) denotes a hash of x.

KG generating header and salt generating header are defined constants.

counter is a simple integer counter.

T1 is the public header containing IDs of Alice, Bob, and all key recovery agents.

S is the exchanged random S.

Hash(T1) Binding in e: The detailed design of the encrypted KG values is this:

$$ePUa1(Hash(T1), KGa1, salt1)$$

The data block encrypted with PUa1 (above) shows the inclusion of both a hash of the public header T1 and a salt. The inclusion of the hash of T1 binds the KG value to a specific header, so that the agents can associate the decrypted KG with the indicated set of parties and agents as specified in the public header T1. The inclusion of a salt provides further protection of the encrypted KG value.

AI Transmission: Alice and Bob may optionally include key recovery Authorization Information (AI) in the SKR information (e.g., the phase 2 SKR block). For practical purposes, the AI information in the present invention includes the defined uses of the self-identification data described by Fischer (U.S. Pat. No. 5,436,972), as well as the ways for using AI described herein. However, the present invention differs from Fischer in the way the AI information is coupled to the secret KG keys.

The AI information (identification information, authentication information, or authorization information) is optionally used to validate possible subsequent key recovery requests. The SKR framework allows the exact content of such recovery authorization records to vary depending on the needs of the application and user. Each SKR phase 2 block defines values (KAa1.1, KAa1.2, etc.), derived from an agent's KI. These KA values are used in some way to protect the AI data. In the nominal method, the AI information is simply hashed with the respective KA key, as in a keyed hash of the form Hash(AI, KA, T2). In this method, Alice can validate a recovery request by providing AI (typically a pass phrase) to the agent, who can then validate the hash, and thereby validly ask for the return of the corresponding KK. In this example, KA is used as a key in a seeded hash operation.

Other methods may be used to protect the AI data. For example, Alice could use a passphrase to encrypt the KA, as in AI(KA, T2). At recovery time, Alice could use the passphrase to decrypt the field to recover KA, and submit for recovery authorization. In this case, KA is used as a codeword or authorization token. As only Alice, the agent, and in some cases Bob (if Alice and Bob share S) know KA, it protects Alice's passphrase from forward attack. In this mode Alice has the added benefit of not having to reveal her passphrase to the agent.

By default, the AI information is included in block 2 in plaintext in the form:

Hash(authorization header, counter, AIa1, KAa1.i, T2 for i-th session),

Hash(authorization header, counter, AIa2, KAa2.i, T2 for i-th session),

Hash(authorization header, counter, AIb1, KAb1.i, T2 for i-th session),

Hash(authorization header, counter, AIb2, KAb2.i, T2 for i-th session)

The AI may be the same for all agents and sessions, across agents and session, or combinations thereof as desired. The values of AI may simply be some secret password or passphrase, although users and agents may agree on any standard contents.

The method for handling AI within the SKR mechanism is different from the method described by Fischer. Fischer binds or couples a secret (in our case KG) with the self-identification data (in our case AI) by first combining the secret and the self-identification data and then encrypting at least a portion of this combination with the public key of a trustee (in our case a key recovery agent). However, in the present invention, AI is not combined with KG and encrypted under the public key of the key recovery agent, since in that case it would be impossible for Bob, who does not know the AI information, to validate the encrypted KG values.

In one embodiment of the present invention, Bob validates the encrypted KG values from Alice, in which case the encrypted values cannot contain AI. Therefore, the present invention requires a method of binding AI and KG that will operate in all embodiments of the invention, including the case where Bob validates the encrypted KG from Alice. To allow this, we first derive KI and thence KA from KG, so that the secret used in the coupling operation is not KG, thereby not exposing KG repeatedly in the authentication code generation process. Then AI and KA are combined, possibly with other information, and the combination is hashed to produce an authentication code. Alice is able to create the authentication code, since she knows S and can therefore generate any of the keys in the key hierarchy, and she knows her own AI, which may contain secrets.

To allow the key recovery agent to validate the Hash(AI, KA, T1), Alice must provide AI to the key recovery agent. There are different possible options for doing this, which includes appearing in person and presenting credentials, or using an intermediary who validates a user's credentials, prepares an AI record and sends it securely to the key recovery agent, or Alice could prepare her own AI record, encrypt it under a key known to the key recovery agent, and send the encrypted AI to the agent electronically. For example, AI could be encrypted under the public key of the agent and sent to the agent.

By decoupling AI and KG, in the manner described, the AI provided or made available to the key recovery agent can be used repeatedly for a long period of time. Typically, AI would remain constant over many different KG. Also, the AI may contain a large amount of data, and hence may require multiple public key encryptions, in which case it would be disadvantageous to repeatedly send AI together with each KG.

Figure 5:
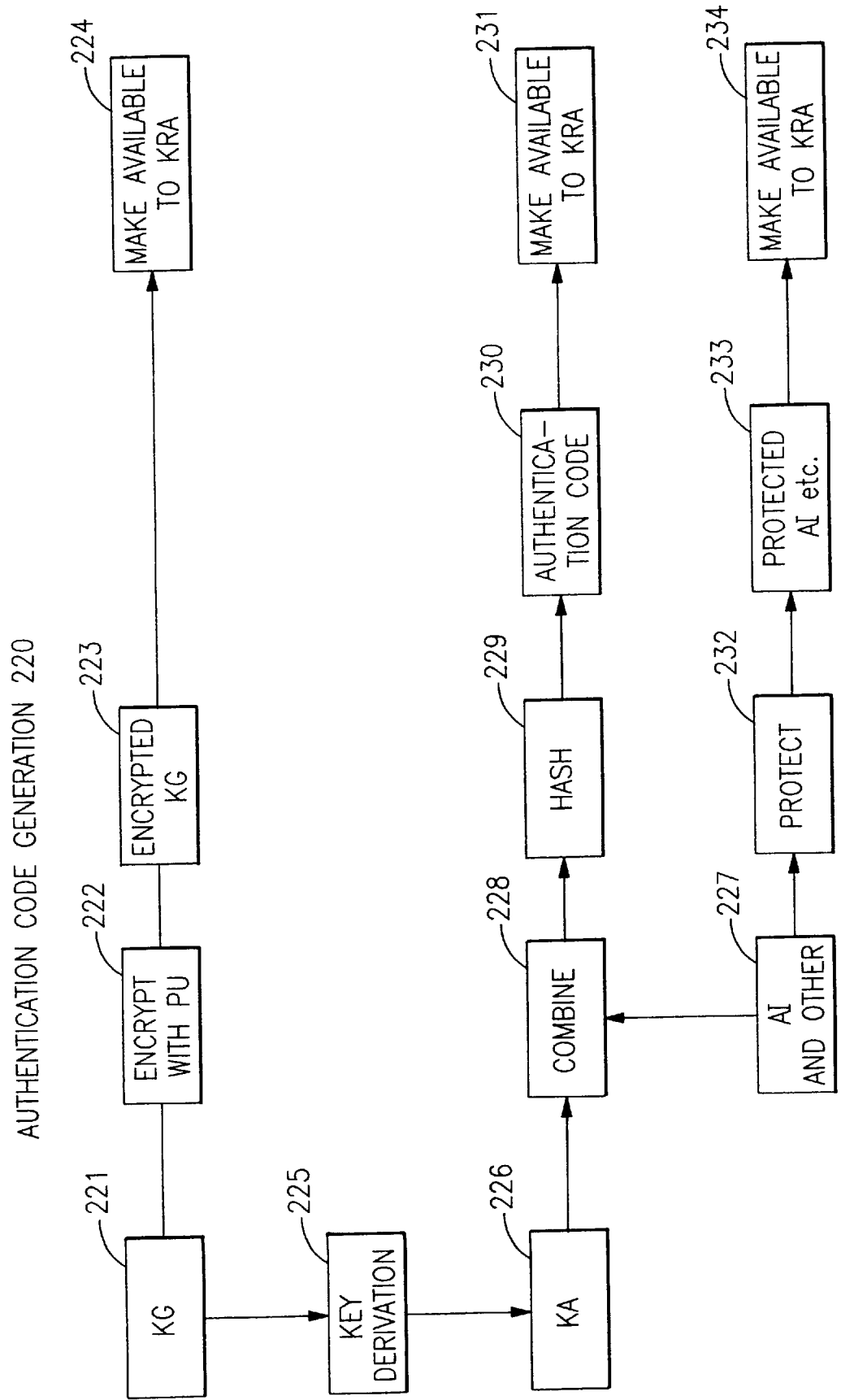
FIG. 5 illustrates the process of authentication code generation.

FIG. 5 illustrates the process of SKR Authentication Code Generation 220. A user prepares Authentication Information, AI 227, which is protected at step 232 (e.g., via encryption under a key known to the key recovery agent). The resultant Protected AI 233 is then made available to the key recovery agent at 234. These steps could be accomplished by encrypting the AI with the public key of the key recovery agent and then sending the encrypted AI to the key recovery agent. This step would be performed prior to using the SKR system. Later, a KG 221 is encrypted with the public key of a key recovery agent at 222, producing an encrypted KG 223, which is made available to a key recovery agent at 224. In this case, the encrypted KG 223 is "made available" by including it in SKR Block 1. For each session, a key derivation step 225 is performed to derive a KA 226 from KG 221. The so produced KA 226 and the AI 227 and possibly other information (e.g., control information specifying which KK is to be returned in response to a valid key recovery request) are combined at 228 (e.g., by concatenating the values) and the combination is hashed in 229 to produce an Authentication Code 230. Authentication Code 230 is then "made available" to the key recovery agent by including it including it in SKR Block 2.

As a consequence of the described method of Authentication Code Generation 220 in FIG. 5, a user's request for KK is validated as follows: The user must first prove his identity or right to access the requested key by supplying information that the key recovery agent can verify against his copy of the stored AI. Many different ways for accomplishing this are well known in the art, and hence do not need to be further described here. Part of the validation step requires the computation of KA. For example, if the user's request is for the i-th KK, then the key recovery agent first calculates the corresponding i-th KA. The key recovery agent next calculates a hash on the input value consisting of (AI, KA, T2), where T2 is obtained from the session recovery information provided by the user. If the calculated hash value matches the value of the corresponding hash-of-reference included in the supplied SKR Block 1, then the request is considered valid, and the requested KK is calculated and returned by the key recovery agent.

ID's and Namespaces: ID's for users and agents can be of many types, such as X.509 Distinguished Names, PGP ascii names, PGP keyids, IP addresses, DNS host names, e-mail addresses, etc. In SKR, all ID's may be expressed as a tuple consisting of a namespace identifier and an ascii name within the indicated namespace, in accordance with draft RFC draft-ietf-ipsec-cdp-00. This draft reserves namespace indexes from 250 to 255 for application private use. SKR may treat namespace 250 as private to the application, and therefore expect the application to handle all queries with respect to all ID's of this type, such as requests for public keys, requests for country information, etc. As there is no defined namespace for country ID's, SKR may use namespace 251 for SKR specific country names.

User Registered Public Keys: In the nominal design, the KG values are encrypted under the public key of the respective agents. This description implies that each agent has only one public key. The SKR data format specifies a keyid used for a given agent, so the agent may have any number of keys. This is an important feature, as the use of a single key would raise concerns about the long term security of the corresponding private key. By allowing for multiple keys per agent, an agent may simply have a set of keys for all users, or they may have keys specific to a set of users (as those of a particular organization, which may be regarded as the "user"), or they could even have a separate key for each individual user. Users could even generate the key pair, and register them with an agent, ensuring that the keys were well made, and changing them at a desired frequency.

Any one of several different methods may be used to register user-generated recovery keys with key recovery agents. In one method, each user registers his or her own public and private key pair for use in the key recovery procedure with one or more key recovery agents. Each user then uses the public part of his or her registered key for encrypting key recovery values. With this granularity, users have the flexibility to periodically change the recovery key pair to limit exposure, in case the private recovery key is somehow compromised.

This first method assumes the presence of a public key infrastructure in which key recovery agents have public/ private signature (certification) keys for signing and public/ private keys used for encryption and distribution of keys. It also assumes that means exist for the generation and distribution of these keys and that means exist for users to validate the public portion of these keys. The means for establishing such an infrastructure are well known in the art.

In this first method, users register the private portion of the recovery key pair by encrypting it with the public encryption key of the key recovery agent. This allows the on-line registration of recovery keys with the key recovery agent. As part of the registration process, the key recovery agent validates that the public and private keys are a valid key pair. In that way, the key recovery agent knows that it has the correct private key for decrypting information encrypted with the public key.

In this first method, the key recovery agent optionally makes use of a signature (certification) key which is made available to users. After validating a user's registered key pair, the key recovery agent signs (certifies) the registered public key with its signature (certification) key. The signed (certified) public key is returned to the user, who validates the signature (certificate) with the public portion of the key recovery agent's signature (certification) key. In this way, the user knows that the key recovery agent has the means to decrypt key recovery values, and therefore that the key recovery procedure can be carried out.

It will be appreciated that where there are a large number of individual users, it could easily become impractical for every user to register his or her recovery keys with key recovery agents. Therefore, a variant of the first method provides for granularity of recovery keys at the organizational level rather than that of the individual user. Groups of users who belong to a common organization, e.g., the employees of the same company, would have the same recovery key.

In this variant, each organization registers its own public and private key pair for use in the recovery procedure with one or more key recovery agents. For example, a company would generate its own recovery key pair and register these keys with one or more key recovery agents. In this case, the company would generate a first recovery key pair which it would register to a first key recovery agent and it would generate a second recovery key pair which it would register with a second key recovery agent. Company employees would then be expected to use the public portions of the company-generated recovery keys to encrypt key recovery values under the recovery procedure.

Except as noted, this variant is the same as the individual user variant. However, with organization-wide recovery keys, the number of registered (or escrowed) recovery keys is significantly reduced, since the number of potential organizations who might register keys under this variant would be far less than the number of potential users who might register keys under the individual user variant of this first method.

However, a disadvantage of either variant of this first method is that the private portion of the recovery key is made available to the key recovery agent on-line by encrypting it with a key belonging to the key recovery agent. Thus, the advantage of having multiple recovery keys, and spreading the exposure across these multiple keys, is rendered ineffective by encrypting the private portions of these key under a single key belonging to the key recovery agent.

Therefore, in an alternative method of recovery key registration, the private portion of the recovery key is not registered on-line by encrypting it with a key belonging to the key recovery agent. Instead, the key registration is implemented in a way that is both provably secure and auditable, so that the users and companies have full confidence in the key recovery agent.

In this alternative method, a user could register a tamper-proof hardware public key token (e.g., a smart card or PCMCIA card) with the agent. This token would be designed to generate its public key pair based on internal hardware random numbers, and would reveal only the public portion of the pair. It would never reveal the private part of the key, but would instead only use the private part for decryption of any submitted recovery requests. (Alternatively, private key could be externally generated and stored in the token, or the public portion of the recovery key could be provided in some other manner, if so desired.) Thus the user could be extremely confident that their recovery private key is never compromised, and that any use of the key would be auditable.

The card would be plugged into a reader at the key recovery agent, so that the public key could be retrieved, and so that the card could be challenged to verify that it contains the secret key matching the newly submitted public key. The process of validating that the token contains the correct private part of the recovery key is well known in the art. It could consist of sending a series of random values to the token and requesting the token to encrypt the values (one at a time) under the secret key. The public key would then be used to decrypt and compare the outputs with the known inputs. If the values compare equal, then the private key on the token is valid. Otherwise, the token is rejected. Once verified, the token would be unplugged and stored in a vault or safe. The token would be retrieved from the vault or safe and used only under a warrant or court order, and even then it would not reveal the private key. It would only decrypt the supplied encrypted key recovery values.

With this alternative method, one has the advantage that the private portion of the recovery key is never exposed by encrypting it with a key belonging to the key recovery agent. In this case, the key is stored on a token and even the key recovery agent cannot determine the value of the private portion of the recovery key.

With this alternative method, one also has the advantage that the tokens can be audited. In this case, the private portion of the recovery key is stored within a physical device that can be inspected for evidence of tampering. It can be marked or tagged and can be periodically audited to ensure that it has not been misused. The token can also record all instances of usage, and this information can be "dumped" during an audit, to ensure that the card information agrees with the audit log of the token.

With this alternative method, an organization can be certain that the key and token will only be called into use by a key recovery agent if one of its employees is the subject of investigation. The recovery of other keys by law enforcement, which belong to non-organization employees, will not require the use of the organization-supplied tokens containing organization-supplied recovery keys. Therefore, one has greater assurance that the recovery keys are protected.

In each of these methods, it is assumed that the key recovery system software or hardware contains a list of public certification keys. These public certification keys could include public certification keys belonging to key recovery agents as well as certification authorities (CAs). In this case, we have a two-level hierarchy in which the public portion of the recovery keys are signed (certified) with a certification key and where the certificates containing the public portion of the recovery keys is validated dynamically using one of the public certification keys "hard coded" into the recovery system software or hardware.

Given this type of facility, users would be able to choose their level of recovery security versus cost. Most users would probably simply use the certified public encryption key of the agents of their choice. For additional cost they could use the on-line method to register their own recovery key periodically. For a higher cost, they could register their key physically on a smart card. The higher costs associated with audited physical storage of a smart card would probably limit its use to large corporations, or businesses with exceptionally valuable communications, but the users would be able to choose both the level and frequency of key update.

Recovery agencies would probably welcome registration by smart cards, as the auditable physical security provided would make it difficult for a user to claim that their key was compromised in any way by the recovery agency.

With these alternative methods, a user could choose from a security spectrum which trades the inconvenience of some form of prior registration with the agent for greater security.

Hash Properties and Key Generation: SKR uses a hash for key and salt derivation, for generating a recovery validation hash, for generating recovery authorization information, and as part of the keyed shuffler method of symmetric encryption. Nominally SKR uses SHA-1 for the hash, although any cryptographic hash may be used. The hash mainly needs to be non-invertible, so that knowledge of the hash of a value does not provide a tractable method of determining the original value. In addition, the hash needs to depend on all input bits, so that its use in the recovery validation and recovery authorization is reliable. The hash does not need the stronger property of collision resistance, although collision-resistant hash functions may be used as long as they satisfy the prior two requirements.

In this document, the hash is used in the form H(a, b, c, . . . ). With a "good" hash, the order of the input values does not matter, and may be specified in any order. As a practical matter, the order may be significant, particularly with the treatment of a key in the keyed hash. The orders shown in this specification are merely possible orders, and the invention is not limited to the specific orders of the inputs in any of the hashing operations describing the SKR system. Implementations with differing hash algorithms may vary the order as appropriate.

Degenerate Case Where S=K: For some applications it may be difficult or undesirable to exchange S, or to have SKR exchange it in phase 1. For example, if the application cannot support an additional exchange of S, and Bob's public key is unknown or Bob does not have a public key, there would be no way to communicate a random S to Bob. In this case there are two possibilities: either Alice and Bob can create their own independent S values, and not do full checking of each other's packets (they could do partial checking, but could not validate the encrypted KG values), or they could let S=K.

If S is simply set to K, the SKR blocks are defined the same as before, but the method has several disadvantages. First, since K must be known, the phase 1 SKR block cannot be precalculated. (Once a phase 1 SKR block is calculated from a K, it can still be cached.) Second, if a given S (set equal to some K) is cached, the separation of knowledge between the agents and law enforcement is violated, as a lawful recovery of the K would reveal S to law enforcement, so recovery of all keys recoverable under that S would also be recoverable by law enforcement. Third, semantic security of the key K is lost. That is, given a guess of K, anyone can test the guess by forward calculating the SKR blocks and comparing them for equality.

As setting S=K reduces security, and imposes some performance disadvantage, it should be done only if there is no alternative, which means only if: 1) the application cannot exchange S; 2) Bob's public key is not known or is not available; and 3) the communication is non-interactive. For file applications, where Bob=Alice, there should be no need to set S=K.

Detailed SKR Protocol

The following is a detailed nominal SKR protocol specification, which attempts to be as general as possible, allowing for cases involving interactive or non-interactive communications, one or more communicating parties, with one or more agents per party, and one or more communications per SKR phase 1 block. This protocol specification is only one example specification, as the SKR method may be tailored for a given application. For example, if an application deals only with domestic encrypted data archives, the application could use a substantially smaller and simpler protocol.

Phase 1

1. If possible, Alice and Bob exchange a random SKR seed S.
2. Alice sends to Bob the SKR phase 1 data block (B1), composed of:
   M1 (a magic identifier to indicate an SKR block 1)
   T1 (the SKR phase 1 public header)
   PR1 (Party Record for communicating party 1)
   . . .
   PRk (Party Record for communicating party k)
   RAR1 (Recovery Agent Record for agent 1)
   . . .

RARn (Recovery Agent Record for agent n)
where
1. T1 is composed of:
    SKR version number
    SKR public key encryption method (nominally RSA)
    SKR secret key encryption method (nominally keyed shuffler)
    SKR hash method (nominally SHA-1)
    flag indicating if SKR is to transmit S to parties
    number of parties
    number of agents
    size in bits of supplied KG
    crypto period of KG information
    SKR block 1 timestamp
    SKR block 1 ID
2. Each PRi block is composed of:
    party id (namespace number and communicating user's name)
    country id (namespace number and country name)
    keyid (id of party's public key)
    ePUi(S, Ri) (if SKR is doing the exchange of S)
3. Each RARi block is composed of:
    set number (which set of agents this agent is in)
    agent number (which agent this is within the set)
    agent ID (namespace, name)
    agent's keyid (which of the agent's public keys was used)
    agent's key size in bits
    ePUx(T1∥KGx, saltx)
4. Where
    KGx=Hash(key generating header, counter, T1, agent x's ID, S)
    saltx=Hash(salt generating header, counter, T1, agent x's id, S)

Phase 2
1. If possible, Alice and Bob exchange a random session key K.
2. Alice sends to Bob the SKR phase 2 data block (B2), composed of:
    M2 (a magic identifier to indicate an SKR block 2) T2
    Hash(B1)
    PR1 (optional Party Record for party 1)
    . . .
    PRk (optional Party Record for party k)
    RAR1 (optional Recovery Authentication Record for agent 1)
    . . .
    RARn (optional Recovery Authentication Record for agent n)
    KRR1 (Key Recovery Record for set of agents 1)
    . . .
    KRRm (Key Recovery Record for set of agents m)
where
1. T2 is composed of:
    T1
    flag to indicate if PR records are used to exchange K
    flag to indicate if optional RAR records are included
    session id
    session timestamp
    session key type (i.e., encryption algorithm—DES, IDEA, . . . )
    session key size in bits
    session key crypto period
2. Optional PRi is composed of:
    party id (namespace number and name of communicating user)
    keyid (id of party's public key)
    ePUi(K, Ri) (if SKR is doing the exchange of K)
3. Optional RARi is composed of:
    set number s (which set of agents)
    agent number a (which agent within the set)
    Hash(authorization header, counter, AIsa, KAsa.i, T2 for i-th K)
4. KRRi is composed of:
    set number i (which set of agents)
    size of R in bits
    fKKi1.1(fKKi2.1(K))–R
    Hi=Hash(validation header, counter, fKKi1.1(fKKi2.1(K)), T2, KKi1.1, KKi2.1)
5. KGx=Hash(G generating header, counter, T1, agent x's ID, S)
6. KHx=Hash(H generating header, counter, T1, agent x's ID, KGx)
7. KIx=Hash(I generating header, counter, T1, agent x's ID, KGx)
8. KKx=Hash(KK generating header, counter, T2, agent x's ID, KHx)
9. KAx=Hash(KA generating header, counter, T2, agent x's ID, KIx)

Global Communications Policy Table

Referring to FIG. 8, the information required by the key recovery system of the present invention is stored in a table 800 called the global communications policy table. Table 800 is for illustrative purposes only. In an actual implementation the data would be stored appropriately, perhaps in separate tables, one specifying the key recovery agents' public keys and one specifying the rules. Table 800 contains information allowing the system to calculate the sizes of the keys and key recovery values for specific algorithms and users located in different countries. It may also contain the public keys of key recovery agents authorized for each country. The numbers in table 800 are examples only to demonstrate the kind of flexibility the present invention permits. The variations are virtually unlimited. In particular, each country may have many key recovery agents.

For inter-country communications, the key recovery system can determine the receiver's country ID from his public key certificate or comparable system configuration information. Using the sender's origin country ID and the receiver's destination country ID, and the algorithm ID of the intended encryption algorithm to be used by the sender and the receiver, the key recovery system will determine the following: (1) the maximum key length that the sender and the receiver can use, (2) the allowed R values, which can be different for the sender and the receiver, and (3) the required key recovery agent IDs needed by the key inversion function. The key recovery system then passes this information to the key inversion function. The key length is the smaller of the two key length values. For example, for countries X and Y the key values for DES are 64 and 128 bits, in which case 64 is the value used.

Keyed Shuffler

The keyed shuffler function (hereinafter referred to as shuffler function or just shuffler) is an invertible function that transforms an n-bit input X into a "shuffled" n-bit output Y. The shuffler function performs $i \geq 3$ iterations of shuffling (where i is a variable), which guarantees complete mixing. That is, each bit in the output depends on each bit in the input. In our example, we choose i=3. The specification of the shuffler does not prescribe a particular value for i.

Figure 6:
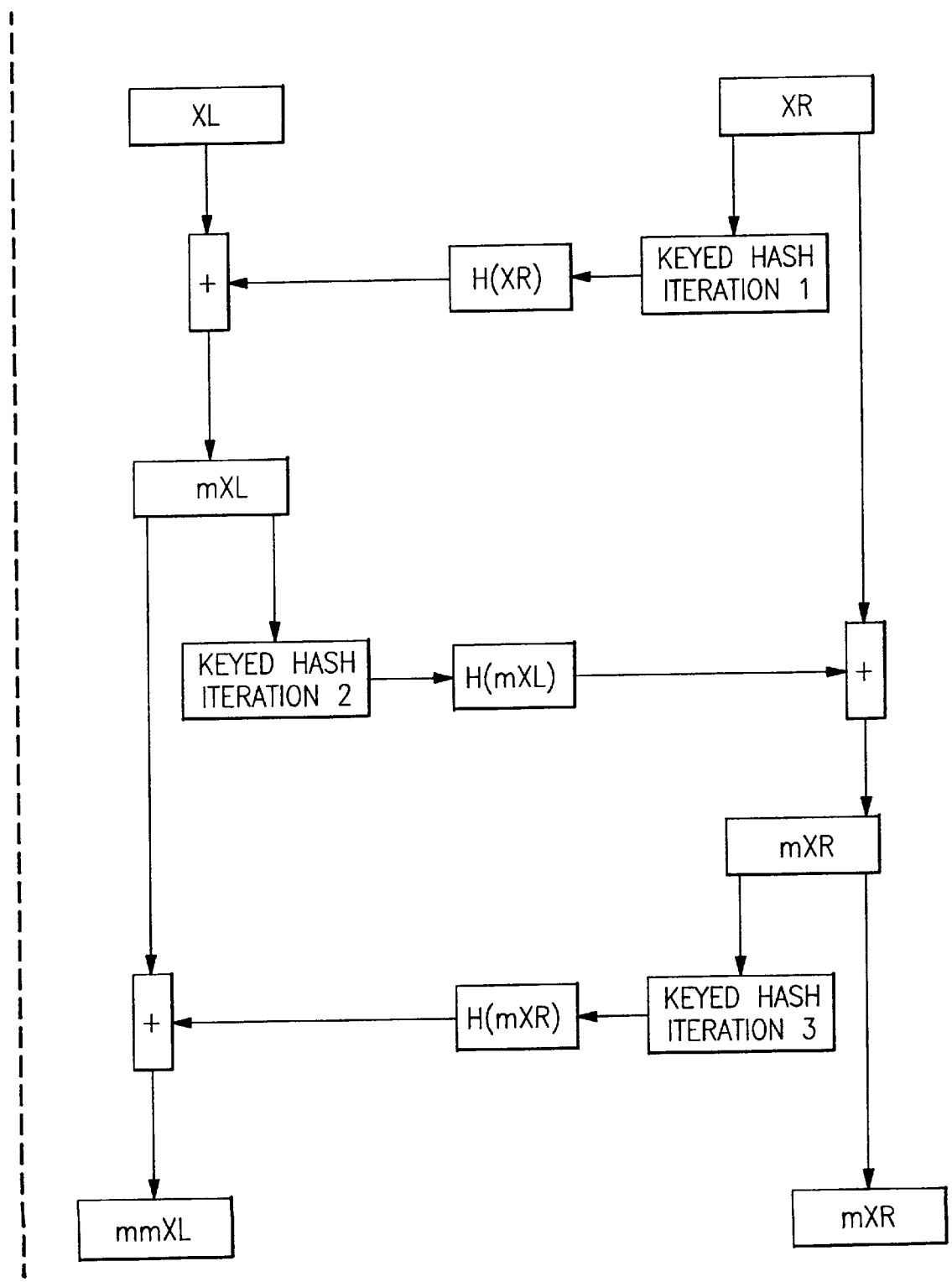
FIG. 6 is a high-level block diagram of the shuffler function of the present invention.

FIG. 6 provides a high-level block diagram of the shuffler function. As a simplification, we assume that the input consists of two 160-bit parts (XL and XR). (The general specification of the shuffler function calls for the function to handle an input of arbitrary length.) At hash iteration 1, XR is hashed to produce a 160-bit hash value H(XR), which is Exclusive-ORed with XL to produce the masked output mXL. At hash iteration 2, mXL is hashed to produce a 160-bit hash value H(mXL), which is Exclusive-ORed with XR to produce the masked output mXR. At hash iteration 3, mXR is hashed to produce a 160-bit hash value H(mXR), which is Exclusive-ORed with mXL to produce the masked output mmXL.

Figure 7:
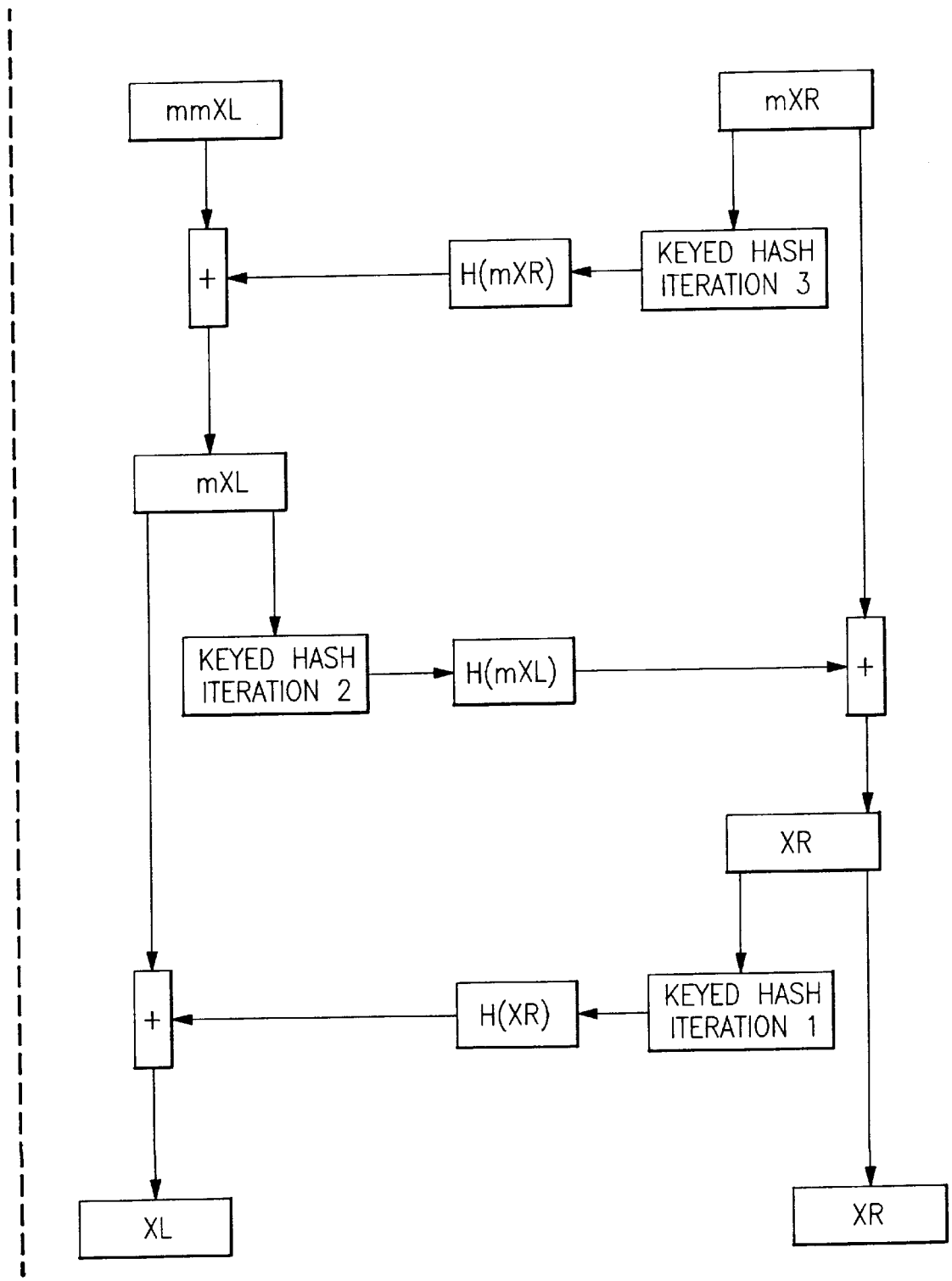
FIG. 7 is a high-level block diagram of the inverse shuffler function of the present invention for "unshuffling" shuffled values.

FIG. 7 illustrates the process of "unshuffling" mmXL∥mXR with the shuffler function to recover the original input XL∥XR. The hash iterations are performed in the reverse order (3, 2, and 1). At hash iteration 3, mXR is hashed to produce a 160-bit hash value H(mXR), which is Exclusive-ORed with mmXL to recover mXL. At hash iteration 2, mXL is hashed to produce a 160-bit hash value H(mXL), which is Exclusive-ORed with mXR to recover the original input XR. At hash iteration 1, XR is hashed to produce a 160-bit hash value H(XR), which is Exclusive-ORed with mXL to recover the original input XL.

General Definition of the Shuffler Function: The n-bit input X is processed by the shuffler function as follows:

1. X is divided into a left part (XL) and right part (XR), where the length of XL and XR are defined as follows: a) if n is even, then XL and XR each contain n/2 bits, whereas b) if n is odd, then XL contains (n−1)/2 bits and XR contains (n+1)/2 bits.
2. XR is used to mask XL. The masked XL is then used to mask XR. And finally, the masked XR is used to further mask the masked XL. The masking operations are defined separately below.

Masking of XL: XL is masked using XR.

XL is first divided into blocks of k bits. If the length of XL is a multiple of k, then each block contains k bits. If the length of XL is not a multiple of k, then XL will consist of one short block (<k bits) and optionally 1 or more blocks of k bits. If a short block exists, it will be constructed from the most significant bits of XL.

k is defined as the block size of the hash algorithm. For example, if SHA-1 is the hash algorithm, then k=160. If MD5 is the hash algorithm, then k=128. Unless otherwise stated in this specification, SHA-1 will be the hash algorithm employed by the shuffler function.

The blocks in XL are divided as follows:

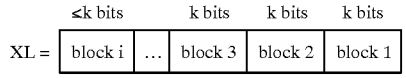

The input to be hashed is defined as follows:

Input=XR∥Public Header where the Public Header is an 10-byte encoded structure as follows:

1 byte Identifier: "shuffler" id
4 bits Iteration: 1=1st iteration
4 bits Algorithm: ID of hashing algorithm
4 bytes Counter: 1, 2, etc. The counter matches the block number in XL to be masked.
4 bytes Length: length of data to be shuffled in bits.

The masking operation consists of the following steps:

1. Set Counter=1. Hash the Input (Public Header∥Key∥XR) with the hash algorithm to produce a k-bit hash H1, where "Key" is the secret key specified to the keyed-shuffler function. Exclusive OR H1 with block 1 from XL to produce the masked block 1 (denoted mblock 1).
2. Set Counter=2. Hash the Input (Public Header∥Key∥XR) with the hash algorithm to produce a k-bit hash H2, where "Key" is the secret key specified to the keyed-shuffler function. Exclusive OR H2 with block 2 from XL to produce the masked block 2 (denoted mblock 2).
3. The operation continues until the last block (block i) has been masked. If the last block is a short block containing j bits (j<k), then block i is masked by Exclusive ORing the least significant j bits of Hi with block i to produce the masked block i (denoted mblock i).

The masked XL is denoted mXL.

Masking of XR: XR is masked using the masked XL (denoted mXL).

The blocks in XR are divided in the same way that the blocks in XL were divided, as follows:

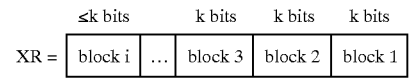

XR is masked with mXL in the same way that XL was masked with XR, except that the Iteration Number in the Public Header is set to 2 (denoting "2nd iteration"). In this case the Public Header is post-fixed to mXL.

The input to be hashed is

Input=Public Header∥Key∥mXL except that the Iteration Number in the Public Header is set to 2 to denote "2nd iteration." The Counter is reset and increments as before, 1, 2, etc. The masking operation consisting of hashing the input and Exclusive ORing the so produced hash values with the blocks in XR.

The masked XR is denoted mXR.

Masking of mXL: mXL is masked with mXR in the same way that XL was masked with XR except that the Iteration Number in the Public Header is set to 3 (denoting "3rd iteration"). The masked mXL is denoted mmXL.

The output of the shuffler is mmXL∥mXR.

Key Specified to the Shuffler: The present invention contemplates that there may be a variety of ways to "key" the shuffler. One method would be to combine the key and the remainder of the input to be hashed, i.e., input=(public header∥key∥data) where data may be XL, XR, mXL, mXR, etc. For example, the key could be prepended (front of input) or appended (back of input). However, just prepending or appending the key is not necessarily enough as it is possible to construct distinguishers (i.e., a statistical test that detects that the function is not behaving as a random one). However, appending and prepending parts of the key to the data will avoid this problem. See M. Luby, C. Rackoff, "How to construct pseudo-random permutations from pseudo-random functions", *SIAM Journal of Computing*, vol. 17, pp. 373–386, 1988. This paper proves that a structure like the shuffler is a pseudo-random permutation if the function used inside is a pseudo-random function. See also M. Bellare, R. Canetti, and H. Krawczyk, "Pseudo-random functions revisited, the cascade construction," to appear in *FOCS* 96. This paper proves that appending and prepending parts of the key to the data are pseudo-random functions if the collision function of the hash algorithm H is pseudo-random.

Therefore, the present invention contemplates that it is preferable to divide the key and prepend one part and append the other part. However, the present invention is not limited to this method of combining the key with the data to be hashed within the shuffler. One may also divide the key into smaller parts and interleave these parts, or combine the key with the data using some other combining function, which may be a simple function or a complex function, before the hashing operation is performed.

What is claimed is:

1. A method of providing for the recovery of a secret value using a key recovery agent, comprising the steps of:

creating a generator value for said key recovery agent;

making said generator value available to said key recovery agent;

generating an encryption key as a one-way function of said generator value; and encrypting said secret value with said encryption key to generate an encrypted secret value, said secret value being recoverable from said encrypted secret value by having said key recovery agent generate said encryption key as said one-way function of said generator value and decrypting said encrypted secret value with said encryption key.

2. The method of claim 1 in which said step of making said generator value available to said key recovery agent comprises the step of encrypting said generator value with a public key of said key recovery agent to generate an encrypted generator value.

3. The method of claim 1 wherein said step of creating said generator value comprises the steps of:

establishing a secret value; and generating said generator value as a one-way function of said secret value.

4. The method of claim 1 wherein said encryption key is a first encryption key, said secret value being a second encryption key.

5. The method of claim 1, comprising the further step of encrypting data using said secret value as an encryption key to generate encrypted data.

6. The method of claim 5 wherein said encrypted data is transmitted from a sender to a receiver.

7. The method of claim 5 wherein said encrypted data is placed on a storage medium.

8. The method of claim 5 wherein said encrypted data is associated with a recovery field.

9. The method of claim 8 wherein said recovery field includes said encrypted secret value.

10. The method of claim 8 wherein said recovery field includes said generator value encrypted with a public key of said key recovery agent.

11. The method of claim 8 wherein said recovery field includes said encrypted secret value and said generator value encrypted with a public key of said key recovery agent.

12. The method of claim 1 wherein said encryption key is generated as a one-way function of said generator value and a dynamic value.

13. The method of claim 1 for providing for the recovery of a secret value using a plurality of key recovery agents, comprising the steps of:

creating a generator value for each of said key recovery agents;

making available to each of said key recovery agents the generator value created for that agent;

generating respective encryption keys as one-way functions of said generator values; and encrypting said secret value with said encryption keys to generate an encrypted secret value, said secret value being recoverable from said encrypted secret value by having said key recovery agents generate said encryption keys as said one-way functions of said generator values and decrypting said encrypted secret value with said encryption keys.

14. The method of claim 13 in which said encrypting step comprises the step of successively encrypting said secret value with said encryption keys to generate said encrypted secret value.

15. The method of claim 13 wherein said step of creating said generator values comprises the steps of:

establishing a secret value; and generating said generator values as respective one-way functions of said secret value, each of said one-way functions being different from one another.

16. The method of claim 15 wherein said step of generating said generator values comprises the steps of:

generating for each of said key recovery agents an intermediate value as a function of said secret value and a value unique to that agent; and generating each of said generator values a generator value as a one-way function of the corresponding intermediate value.

17. A method comprising the steps of:

a) providing a secret value to a trustee; and b) upon a predetermined request, having said trustee calculate a dependent value from at least said secret value and provide said calculated dependent value to a requesting party.

18. The method of claim 17 wherein said trustee calculates said dependent value from said secret value and additional information available to said trustee.

19. The method of claim 17 wherein said trustee calculates said dependent value from said secret value and additional information provided to said trustee.

20. The method of claim 17 wherein said secret value is a first secret value, said calculated dependent value being a second secret value.

21. The method of claim 17 wherein said secret value is a cryptographic key.

22. The method of claim 17 wherein said calculated dependent value is a cryptographic key.

23. The method of claim 17 wherein said calculated dependent value is calculated as a hash value calculated on said secret value.

24. The method of claim 17 wherein said calculated dependent value is calculated as a hash value calculated on said secret value and nonsecret data provided by said requesting party.

25. The method of claim 24 wherein said nonsecret data comprises key recovery information unique to a particular key.

26. The method of claim 17 wherein said secret value is encrypted under a public key of said trustee.

27. The method of claim 17 wherein said secret value is encrypted under a key entrusted to said trustee.

28. The method of claim 17 wherein said secret value provided to said trustee is used to calculate a plurality of dependent values.

29. The method of claim 28 wherein said dependent values are calculated for different requesting parties.

30. The method of claim 28 wherein said dependent values are calculated at different times.

31. A method of encrypting a plaintext block using an encryption key, comprising the steps of:

a) partitioning said plaintext block into first and second parts;

b) subjecting said plaintext block to a plurality of iterations in which said first and second parts are processed as input parts to produce first and second output parts, each of said iterations comprising the steps of:

(1) combining one of said input parts with said key to produce a composite part;

(2) generating a hash of said composite part;

(3) combining said hash of said composite part with the other of said input parts to produce one of said output parts; and (4) producing the other of said output parts from the other of said input parts; and c) combining the output parts produced by the last of said iterations to produce an encrypted plaintext block.

32. The method of claim 31 wherein said one of said input parts is combined with said key by concatenating said one of said input parts with said key.

33. The method of claim 31 wherein said one of said input parts is combined with said key by concatenating said one of said input parts with said key and a public header.

34. The method of claim 31 wherein said one of said input parts is combined with said key by prepending said key to said one of said input parts.

35. The method of claim 31 wherein said one of said input parts is combined with said key by appending said key to said one of said input parts.

36. The method of claim 31 wherein said one of said input parts is combined with said key by prepending a first part of said key to said one of said input parts and appending a second part of said key to said one of said input parts.

37. The method of claim 31 wherein said hash of said composite part is combined with the other of said input parts by modulo addition.

38. The method of claim 31 wherein said plaintext block is subjected to at least three of said iterations.

39. In a cryptographic recovery system in which a user encrypts a recovery value using a public recovery key and provides the encrypted recovery value to a recovery agent, said recovery agent being able to recover said recovery value from said encrypted recovery value using a private recovery key corresponding to said public recovery key, a method of establishing said public and private recovery keys for said user and said recovery agent, comprising the steps of:

generating for said user a recovery key pair comprising a public recovery key and a corresponding private recovery key;

transmitting said recovery key pair in a secure manner from said user to said recovery agent.

40. The method of claim 39 in which said user is an individual.

41. The method of claim 39 in which said user is an organization.

42. The method of claim 39 in which said user makes a plurality of recovery values available to respective recovery agents, said steps being performed for each of said recovery agents.

43. The method of claim 39 in which said recovery agent, upon receiving said recovery key pair, verifies that the public and private recovery keys are a valid key pair.

44. The method of claim 43 in which said recovery agent, upon verifying that the public and private recovery keys are a valid key pair, generates a signature on the public verification key using a private signature key and returns the public recovery key with the signature to the user.

45. The method of claim 44 in which said user, upon receiving the public recovery key with the signature, validates the signature using a public verification key corresponding to said signature key.

46. The method of claim 39 in which said recovery agent has a public encryption key, said transmitting step including the steps of:

encrypting the private key of said recovery key pair using said public encryption key of said recovery agent; and transmitting the public key and encrypted private key of said recovery key pair to said recovery agent.

47. The method of claim 46 in which said recovery agent, upon receiving said recovery key pair, decrypts the private key of said recovery key pair using a private decryption key corresponding to said public encryption key.

48. The method of claim 46 in which said transmitting step includes the steps of:

embedding the private key of said recovery key pair in a device that is operable to encrypt values using said private key but inoperable to reveal said private key; and providing the public key of said recovery key pair and the device containing the private key of said recovery key pair to said recovery agent.

49. A method for operating a cryptographic system so as to permit a recovery agent to selectively reveal secret information to an applicant, comprising the steps of:

deriving a second secret value from a first secret value;

combining said second secret value with authorization information and calculating a first hash value on the combination; and providing said authorization information, said first hash value, and said first secret value to said recovery agent for use in recovering said secret information.

50. The method of claim 49 wherein said authorization information is provided to said recovery agent by encrypting it.

51. The method of claim 49 wherein said first secret value is provided to said recovery agent by encrypting it.

52. The method of claim 49 wherein said recovery agent, upon receiving a recovery request from an applicant, performs the steps of:

deriving a second secret value from said first secret value;

combining said second secret value with said authorization information and calculating a second hash value on the combination;

comparing said first and second hash values for equality; and revealing said secret information if the credentials match with the authorization information and the first and second hash values are equal.

53. Apparatus for providing for the recovery of a secret value using a key recovery agent, comprising:

means for creating a generator value for said key recovery agent;

means for making said generator value available to said key recovery agent;

means for generating an encryption key as a one-way function of said generator value; and means for encrypting said secret value with said encryption key to generate an encrypted secret value, said secret value being recoverable from said encrypted secret value by having said key recovery agent generate said encryption key as said one-way function of said generator value and decrypting said encrypted secret value with said encryption key.

54. A program storage device readable by a machine, tangibly embodying a program of instructions executable by the machine to perform method steps for providing for the recovery of a secret value using a key recovery agent, said method steps comprising:

creating a generator value for said key recovery agent;

making said generator value available to said key recovery agent;

generating an encryption key as a one-way function of said generator value; and encrypting said secret value with said encryption key to generate an encrypted secret value, said secret value being recoverable from said encrypted secret value by having said key recovery agent generate said encryption key as said one-way function of said generator value and decrypting said encrypted secret value with said encryption key.

\* \* \* \* \*